(12) United States Patent
Yabe

(10) Patent No.: US 9,041,966 B2
(45) Date of Patent: May 26, 2015

(54) LICENSE MANAGEMENT SERVER, CONTROL METHOD, AND PROGRAM

(71) Applicant: CANON KABUSHIKI KAISHA, Tokyo (JP)

(72) Inventor: Kenta Yabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/148,252

(22) Filed: Jan. 6, 2014

(65) Prior Publication Data
US 2014/0211219 A1    Jul. 31, 2014

(30) Foreign Application Priority Data
Jan. 28, 2013    (JP) .................................. 2013-013320

(51) Int. Cl.
*G06F 15/00*    (2006.01)
*H04N 1/44*    (2006.01)

(52) U.S. Cl.
CPC ........... *H04N 1/4433* (2013.01); *H04N 1/4426* (2013.01); *H04N 2201/0094* (2013.01)

(58) Field of Classification Search
CPC ...................... H04N 1/00278; H04N 1/00663
USPC ........................................... 358/1.15
See application file for complete search history.

(56) References Cited

U.S. PATENT DOCUMENTS

2010/0014118 A1*  1/2010  Yamano .................. 358/1.15
2011/0066721 A1*  3/2011  Shinomiya ............... 709/224

FOREIGN PATENT DOCUMENTS

JP    2011-180902 A    9/2011

* cited by examiner

*Primary Examiner* — Saeid Ebrahimi Dehkordy
(74) *Attorney, Agent, or Firm* — Canon U.S.A., Inc. IP Division

(57) ABSTRACT

A license management server issues a license required for setting a continuous copying speed of an image forming apparatus to a continuous copying speed specified by a license issuance request.

16 Claims, 25 Drawing Sheets

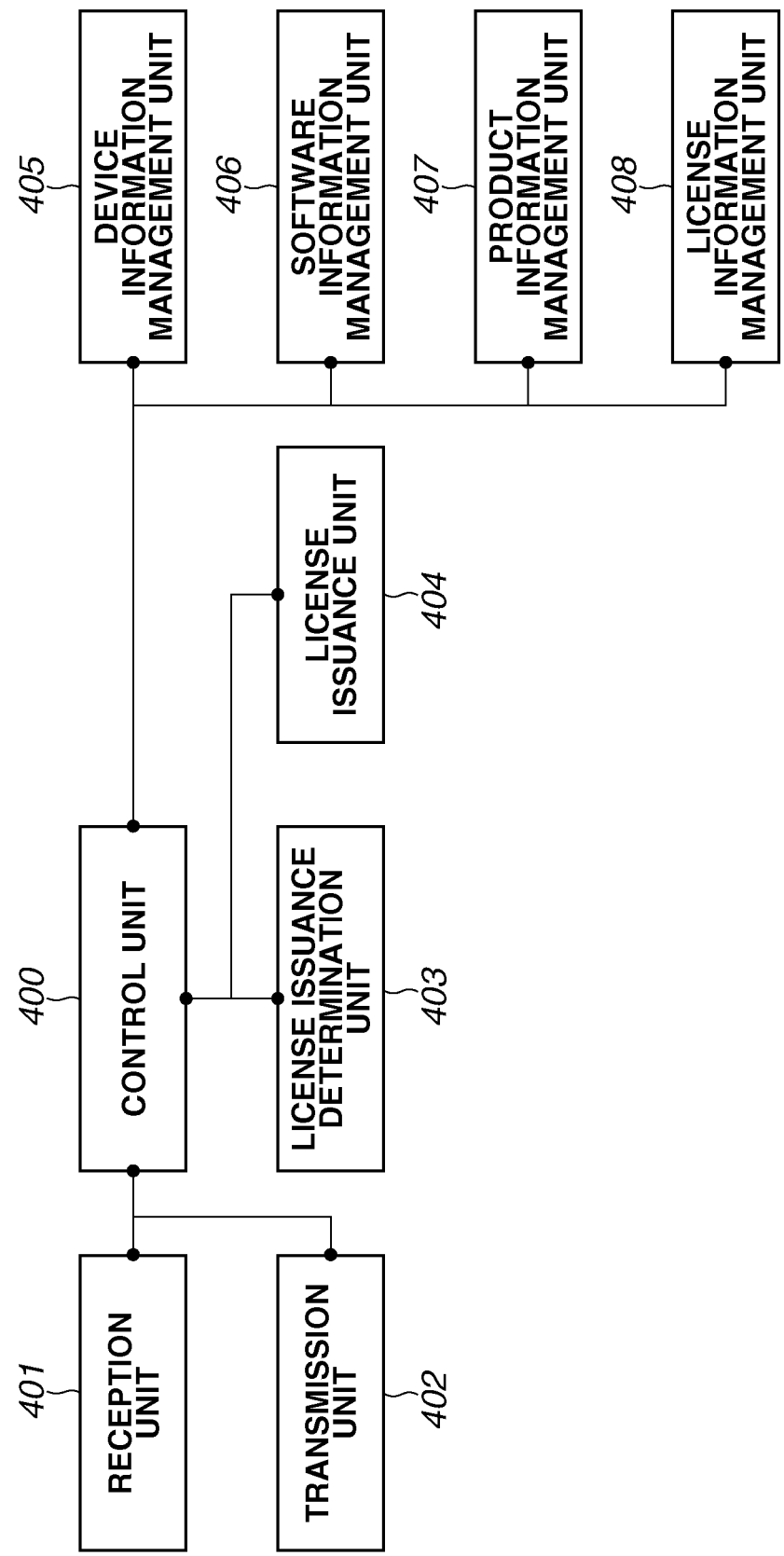

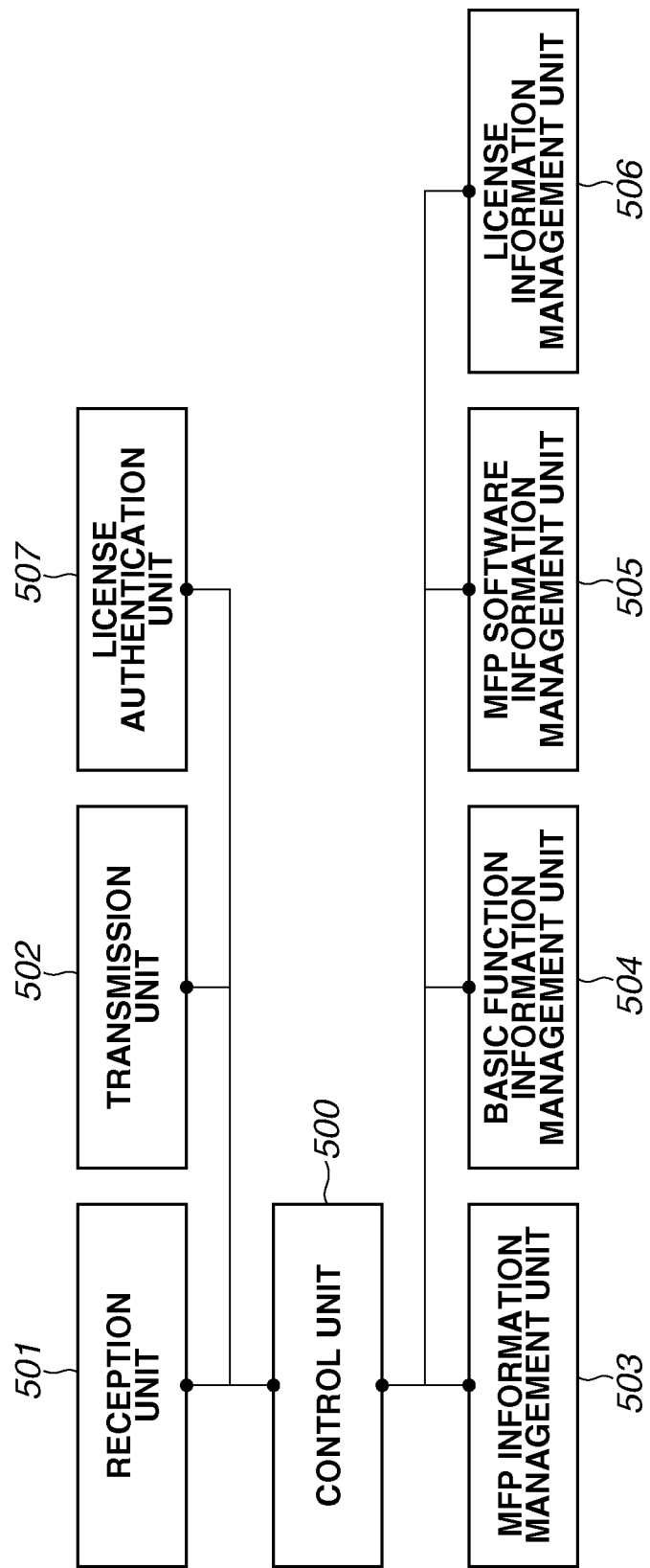

FIG.6A
DEVICE PRODUCT INFORMATION MANAGEMENT TABLE

| DEVICE PRODUCT ID /601 | DEVICE PRODUCT NAME /602 | MODEL /603 | RANGE NUMBER /604 | CONTINUOUS COPYING SPEED SETTING /605 | CONTINUOUS COPYING SPEED /606 |
|---|---|---|---|---|---|
| D001 | MFP001 | AAA | 00000~99999 | OPTIONAL | 20PPM |
| D002 | MFP002 | XXX | 00000~12345 | ESSENTIAL | |
| D003 | MFP003 | YYY | 00000~50000 | UNNECESSARY | 40PPM |
| D004 | MFP004 | ZZZ | 00000~65535 | UNNECESSARY | 60PPM |

~600

FIG.6B
SOFTWARE BASIC INFORMATION MANAGEMENT TABLE

| FUNCTION ID /611 | FUNCTION NAME /612 | FUNCTION TYPE /613 |
|---|---|---|
| F001 | SCAN | OPTION |
| F002 | MAIL TRANSMISSION | OPTION |
| F003 | CONTINUOUS COPYING SPEED CHANGE (25PPM) | PPM |
| F004 | CONTINUOUS COPYING SPEED CHANGE (30PPM) | PPM |
| F005 | CONTINUOUS COPYING SPEED CHANGE (35PPM) | PPM |

~610

FIG.6C
COPYING SPEED CHANGE SOFTWARE BASIC INFORMATION MANAGEMENT TABLE

| FUNCTION ID /621 | CONTINUOUS COPYING SPEED /622 | MODEL AFTER CHANGE /623 |
|---|---|---|
| F003 | 25PPM | BBB |
| F004 | 30PPM | CCC |
| F005 | 35PPM | DDD |

~620

FIG.6D
PRODUCT INFORMATION MANAGEMENT TABLE

| PRODUCT ID (631) | PRODUCT NAME (632) | FUNCTION ID (633) | DEVICE PRODUCT ID (634) |
|---|---|---|---|
| P001 | SCAN OPTION V1.0 | F001 | D001 |
| P002 | MAIL TRANSMISSION OPTION V1.0 | F002 | D001 |
| P003 | CONTINUOUS COPYING SPEED CHANGE (25PPM) | F003 | D001 |
| P004 | CONTINUOUS COPYING SPEED CHANGE (30PPM) | F004 | D001 |
| P005 | CONTINUOUS COPYING SPEED CHANGE (35PPM) | F005 | D001 |

~630

FIG.6E
LICENSE NUMBER MANAGEMENT TABLE

| LICENSE NUMBER (641) | PRODUCT ID (642) | LICENSE ISSUANCE STATUS (643) |
|---|---|---|
| 0987-6543-MNBV-VCXZ | P001 | UNISSUED |
| 1234-FC56-YH44-44H7 | P002 | ISSUED |
| 3DS4-FFF7-3WW5-90WS | P005 | ISSUED |

~640

FIG.6F
LICENSE MANAGEMENT TABLE

| LICENSE ID (651) | LICENSE NUMBER (652) | DEVICE NUMBER (653) | PRODUCT ID (654) | DEVICE PRODUCT ID (655) |
|---|---|---|---|---|
| L001 | 0987-6543-MNBV-VCXZ | AAA12345 | P001 | D001 |
| L002 | 3DS4-FFF7-3WW5-90WS | AAA12345 | P005 | D001 |

~650

FIG.7A
MFP INFORMATION MANAGEMENT TABLE

| DEVICE NAME (701) | DEVICE NUMBER (702) | CONTINUOUS COPYING SPEED SETTING (703) | CONTINUOUS COPYING SPEED (704) |
|---|---|---|---|
| DEVICE001 | AAA12345 | OPTIONAL | 20PPM |

(700)

FIG.7B
CONTINUOUS COPYING SPEED CHANGE SOFTWARE INFORMATION MANAGEMENT TABLE

| FUNCTION ID (711) | CONTINUOUS COPYING SPEED (712) | MODEL AFTER CHANGE (713) |
|---|---|---|
| F003 | 25PPM | BBB |
| F004 | 30PPM | CCC |
| F005 | 35PPM | DDD |

(710)

FIG.7C
MFP SOFTWARE INFORMATION MANAGEMENT TABLE

| FUNCTION ID (721) | FUNCTION NAME (722) | FUNCTION TYPE (723) | STATUS (724) |
|---|---|---|---|
| F001 | SCAN | OPTION | ENABLED |
| F002 | MAIL TRANSMISSION | OPTION | ENABLED |
| F003 | CONTINUOUS COPYING SPEED CHANGE (25PPM) | PPM | DISABLED |
| F004 | CONTINUOUS COPYING SPEED CHANGE (30PPM) | PPM | DISABLED |
| F005 | CONTINUOUS COPYING SPEED CHANGE (35PPM) | PPM | DISABLED |

(720)

FIG.7D
LICENSE INFORMATION MANAGEMENT TABLE

| LICENSE ID (731) | FUNCTION ID (732) | INSTALLATION DATE AND TIME (733) |
|---|---|---|
| L001 | F001 | 2012/12/01 |

(730)

FIG.7E
LICENSE INSTALLATION HISTORY MANAGEMENT TABLE

| LICENSE ID (741) | FUNCTION ID (742) | INSTALLATION DATE AND TIME (743) | UNINSTALLATION DATE AND TIME (734) |
|---|---|---|---|
| L001 | F001 | 2012/12/01 | 2013/04/01 |

| LICENSE ID | FUNCTION ID | DEVICE NUMBER |
|---|---|---|
| 001 | 001 | AAA12345 |

FIG.13

| LICENSE NUMBER 1301 | DEVICE NUMBER 1302 |
|---|---|
| 001 | AAA12345 |

| LICENSE ID | FUNCTION ID | DEVICE NUMBER |
|---|---|---|
| L001 | F001 | AAA12345 |

FIG.17
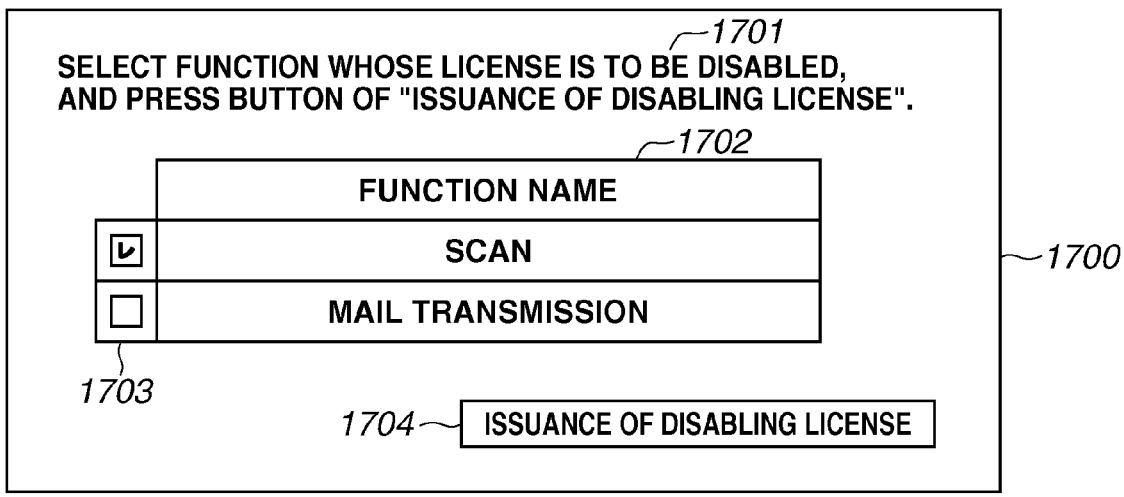
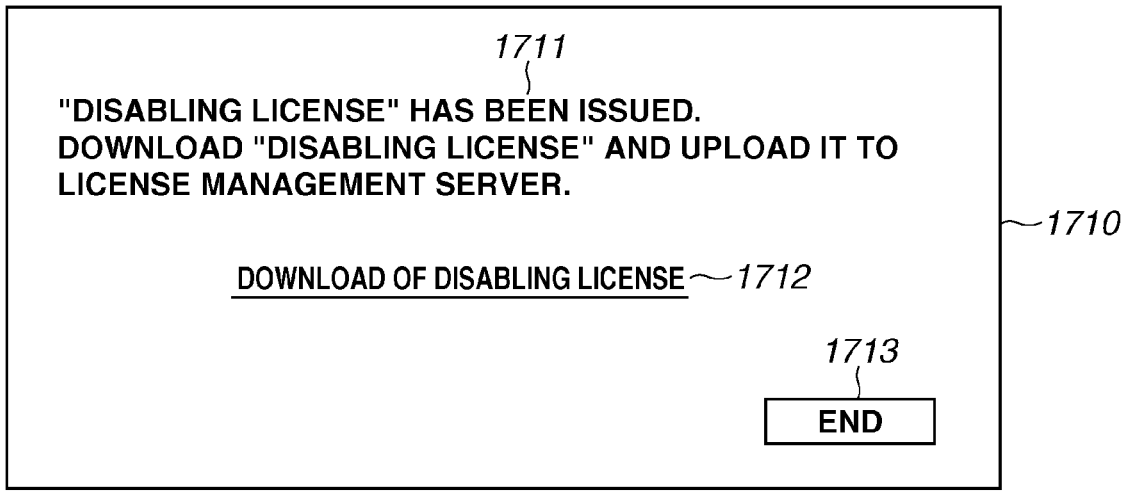

FIG.20

| DEVICE NUMBER (2001) | DISABLING LICENSE (2002) |
|---|---|
| AAA12345 | <BINARY DATA> |

LICENSE OF EXTENDED FUNCTION OF CONTINUOUS COPYING SPEED — 2131
CHANGE CAN BE INSTALLED IN MFP SET AS TRANSFER DESTINATION.

2132

LICENSE OF EXTENDED FUNCTION OF CONTINUOUS COPYING SPEED CHANGE HAS NOT YET BEEN INSTALLED IN MFP OF TRANSFER DESTINATION. BEFORE LICENSE IS ISSUED, LICENSE OF EXTENDED FUNCTION OF CONTINUOUS COPYING SPEED CHANGE NEEDS TO BE INSTALLED. PRESS "ISSUE TOGETHER LICENSE OF EXTENDED FUNCTION OF CONTINUOUS COPYING SPEED CHANGE".

2133 — COLLECTIVELY ISSUE LICENSE OF CONTINUOUS COPYING SPEED CHANGE PRODUCT AND TRANSFER LICENSE

2134 — END

---

LICENSE HAS BEEN ISSUED. — 2141
DOWNLOAD "LICENSE" AND INSTALL IT INTO MFP.

DOWNLOAD OF LICENSE — 2142

2143 — END

2140

---

ISSUANCE OF "LICENSE" HAS FAILED. — 2151

LICENSE NUMBER IS WRONG. — 2152

2153 — END

2150

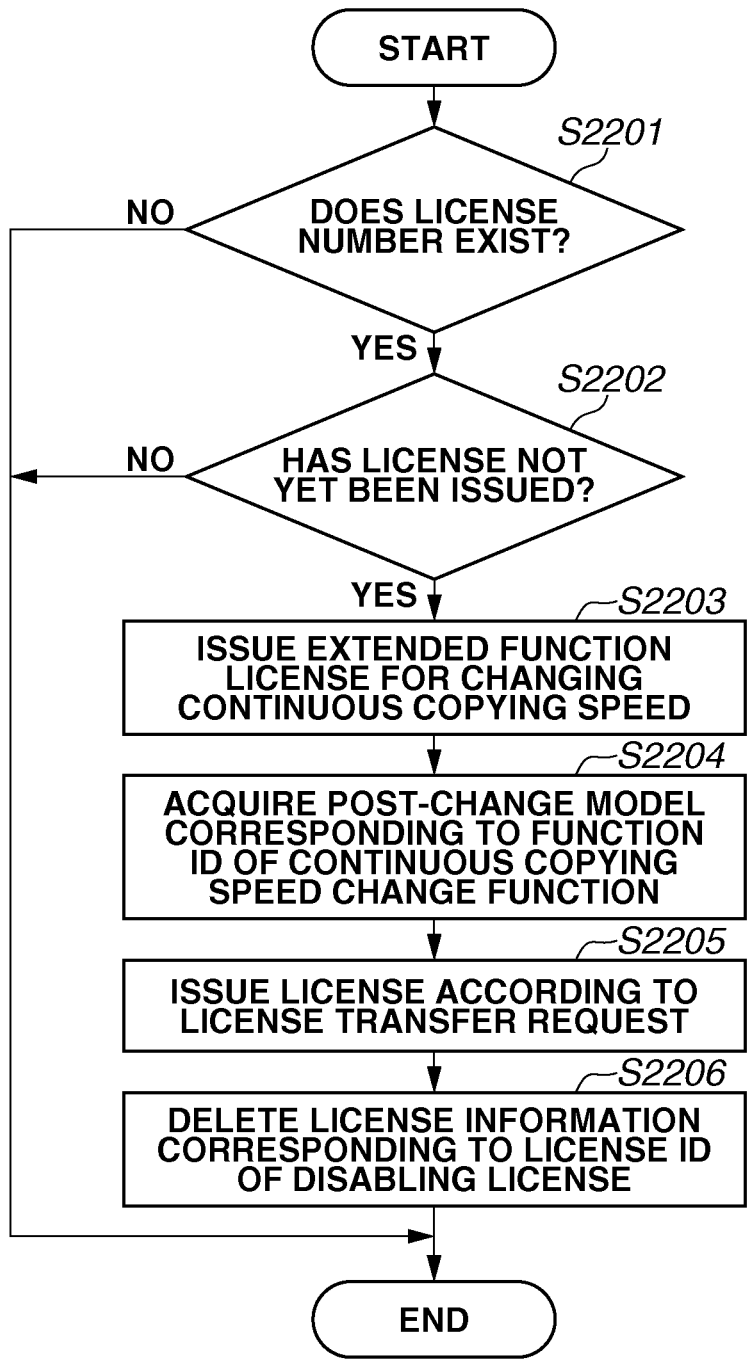

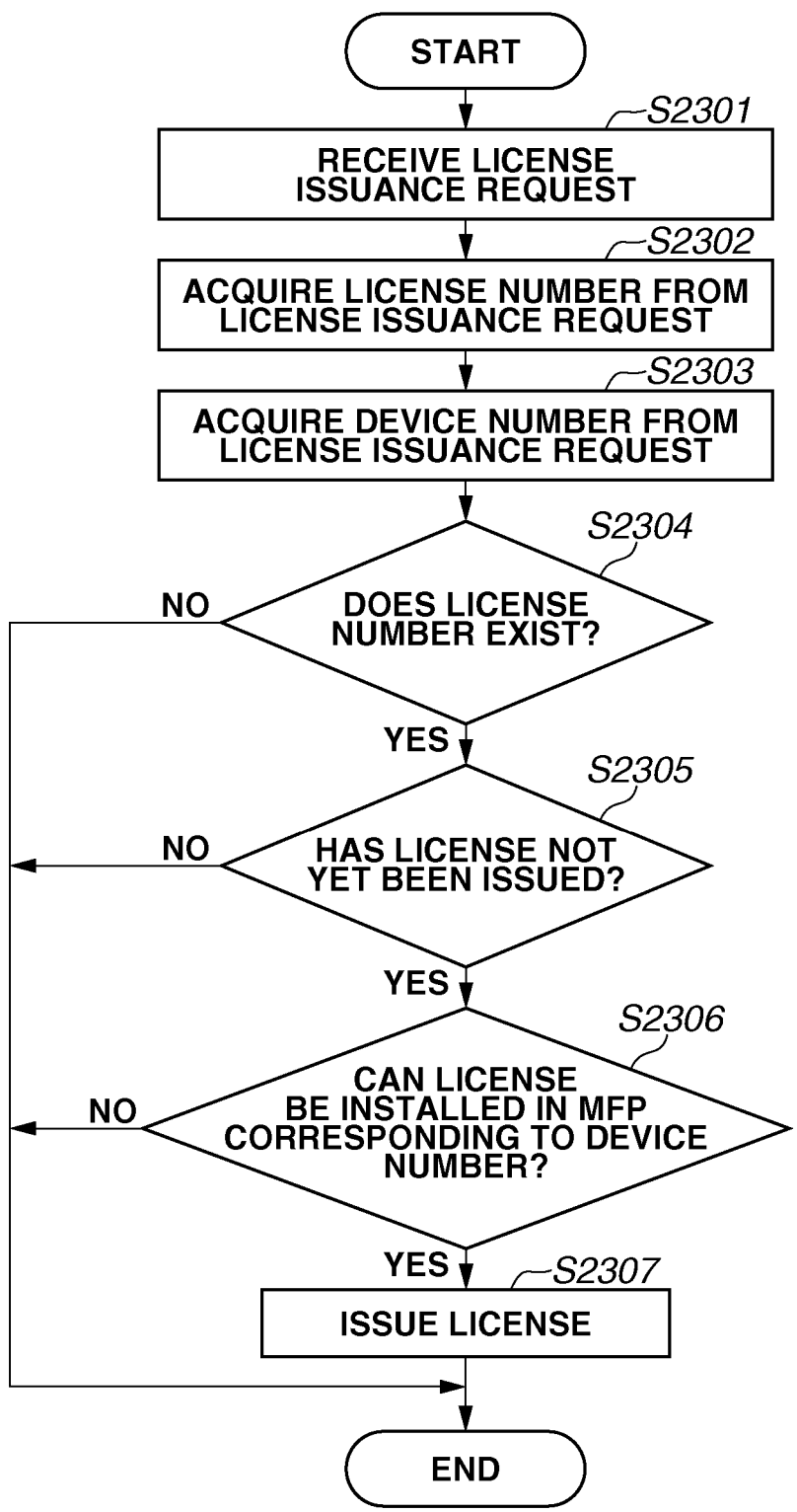

LICENSE MANAGEMENT SERVER, CONTROL METHOD, AND PROGRAM

BACKGROUND OF THE INVENTION

1. Field of the Invention

The present invention relates to a license management server for managing license, its control method, and its program.

2. Description of the Related Art

Until now, a number for uniquely identifying a printer, such as a multifunction peripheral (MFP), (hereinafter, referred to as "device number") and a continuous copying speed (unit in pages per minute (PPM)) which determines a print speed of a printer have been set at the factory shipment.

A user who purchases the MFP installs software for further actualizing an extended function into the MFP to extend the MFP to an MFP on which a function that meets a user's need is mounted. The extended function is normally provided for the user onerously and the extended function with a mechanism for preventing abuse using a license is generally provided.

Japanese Patent Application Laid-Open No. 2011-180902 discusses a method for preventing an extended function of an MFP from being unexpectedly used in such a way that the device number of a device using the extended function is associated with the license corresponding to the extended function, as a mechanism for preventing abuse using a license.

In a case where a user demand concentrates in a printer with a specific continuous copying speed, it may be difficult to speedily supply a printer desired by the user. For this reason, there needs to be a mechanism capable of installing the license for setting the continuous copying speed when the user purchases a printer so that the continuous copying speed can be freely set even after the factory shipment. However, Japanese Patent Application Laid-Open No. 2011-180902 does not consider license control related to the continuous copying speed being a basic function of printers.

SUMMARY OF THE INVENTION

The present invention is directed to a license management server for issuing a license required for setting the continuous copying speed of an image forming apparatus to a continuous copying speed specified by a license issuance request.

According to an aspect of the present invention, a license management server includes an issuance unit configured to issue, in response to a license issuance request being received, a license required for setting a continuous copying speed of an image forming apparatus to a continuous copying speed specified by the license issuance request, the license issued by the issuance unit including information required for changing a device number of the image forming apparatus to which the continuous copying speed is set, and a transmission unit configured to transmit the license.

Further features of the present invention will become apparent from the following description of exemplary embodiments with reference to the attached drawings.

BRIEF DESCRIPTION OF THE DRAWINGS

FIG. 4 is a block diagram illustrating a software configuration of the license management server.

FIG. 5 is a block diagram illustrating a software configuration of the MFP.

FIGS. 6A, 6B, 6C, 6D, 6E, and 6F illustrate a data structure managed by the license management server.

FIGS. 7A, 7B, 7C, 7D, and 7E illustrate a data structure managed by the MFP.

FIG. 8 is a table illustrating a data structure of a license.

FIG. 13 illustrates the data structure of a license issuance request.

FIG. 15 illustrates the data structure of the disabling license.

FIG. 17 illustrates a disabling license issuance screen.

FIG. 20 illustrates the data structure of a license transfer request.

FIGS. 21A and 21B illustrate an example of a license confirmation screen.

FIG. 22 is a flow chart illustrating a series of operations for simultaneously issuing the license in response to the license transfer request and the license of the extended function for changing the continuous copying speed.

FIG. 23 is a flow chart illustrating a series of operations in which the license management server issues the license.

DESCRIPTION OF THE EMBODIMENTS

Various exemplary embodiments, features, and aspects of the invention will be described in detail below with reference to the drawings.

A first exemplary embodiment describes a mechanism in which a license management server issues a license for setting a continuous copying speed and a multifunction peripheral (MFP) as an example of an image forming apparatus installs the license.

Figure 1:
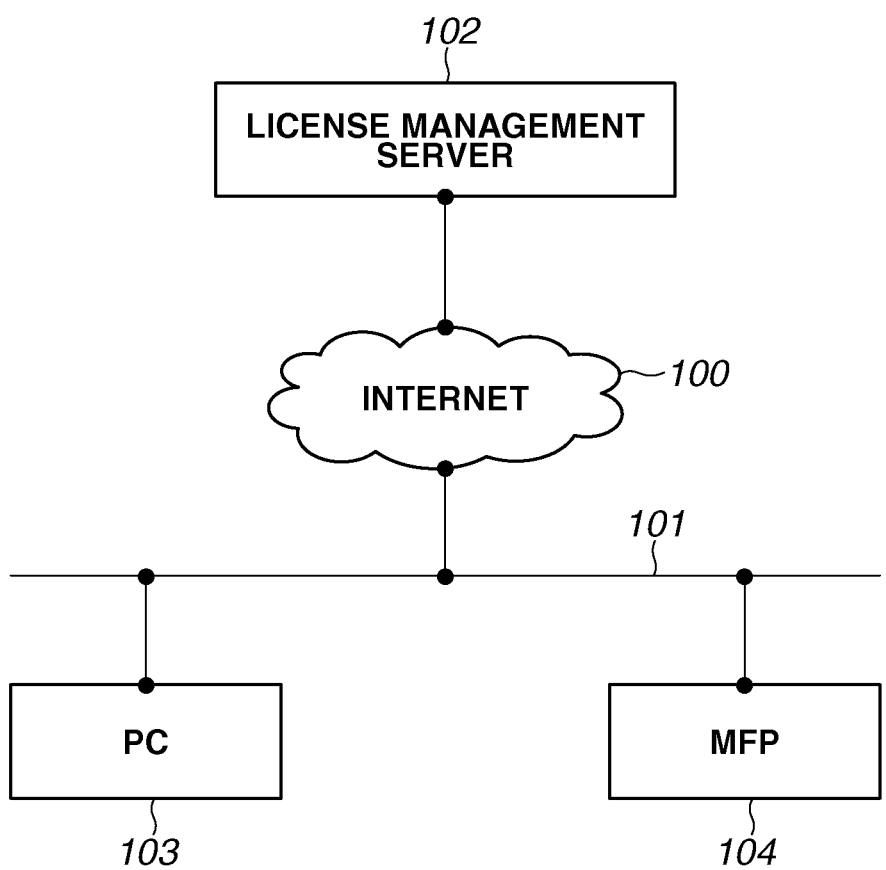
FIG. 1 is a block diagram illustrating an overall configuration of a system.

FIG. 1 is a block diagram illustrating an overall configuration of a system according to the present exemplary embodiment. The Internet 100 connects a license management server 102, a personal computer (PC) 103, and an MFP 104 with one another. In the example illustrated in FIG. 1, one PC and one MFP are connected to one license management server. However, the number of PCs or MFPs is not limited to one, but may be one or more. It is needless to say that a server system with a plurality of license management servers 102 may be used.

A local area network (LAN) 101 is the one that connects the PC 103 with the MFP 104 among the components in the block diagram in FIG. 1. In the example of FIG. 1, one MFP is connected to one PC. However, the number of PCs and MFPs is not limited to one, but may be one or more.

The license management server 102 is an Internet application server that issues a license of software installed on the PC (PC software) and software installed on the MFP (MFP software).

The PC 103 is an information processing apparatus such as a personal computer. The PC 103 communicates with the MFP 104 via the LAN 101. The PC 103 communicates with the license management server 102 via the Internet 100. The MFP 104 is an image forming apparatus equipped with a scanner function, a copy function, a printing function, and a communication function. The MFP 104 communicates with the PC 103 via the LAN 101. The MFP 104 communicates with the license management server 102 via the Internet 100. The MFP 104 is an example of an image forming apparatus, may be a printer only with a printing function, and does not always need to be the MFP.

Figure 2:
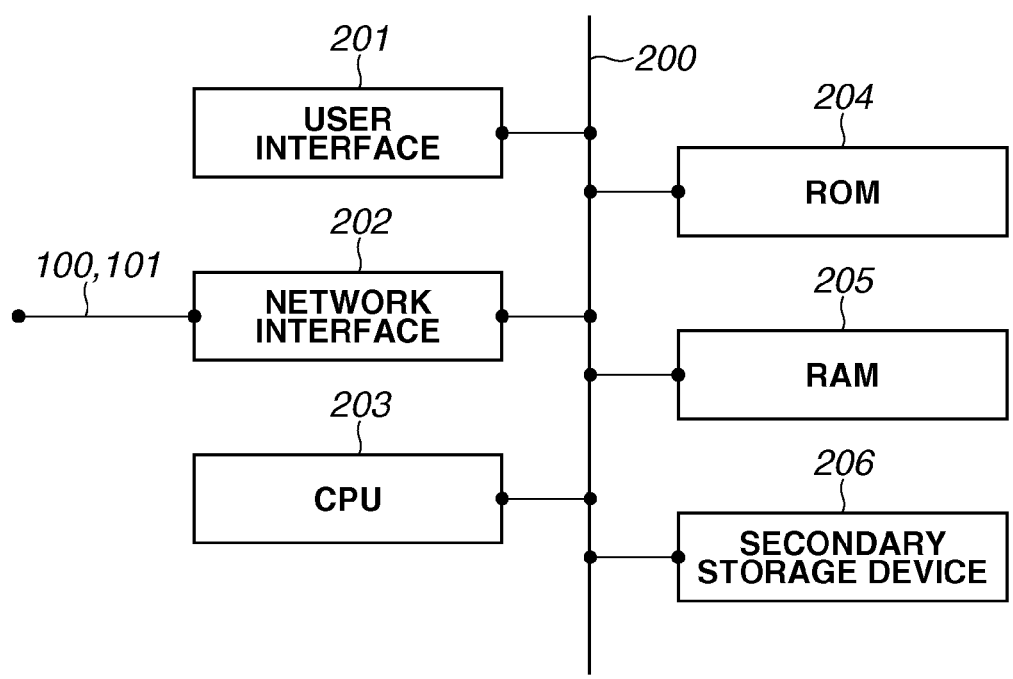
FIG. 2 is a block diagram illustrating a hardware configuration of a license management server and a personal computer (PC).

FIG. 2 is a block diagram illustrating a hardware configuration of the license management server 102 and the computer of the PC 103 illustrated in FIG. 1. A system bus 200 is a bus that connects components forming the information processing apparatus with one another. A user interface 201 is hardware that inputs and outputs information using a display, a keyboard, and a mouse.

A network interface 202 is hardware that connects the server and the PC with the Internet 100 and the LAN 101 to communicate with other computers and network equipments. A central processing unit (CPU) 203 executes a program read from a read only memory (ROM) 204, a random access memory (RAM) 205, and a secondary storage device 206 to realize the functions. The CPU 203 directly or indirectly controls the components connected by the system bus 200. The ROM 204 is a read only memory device that stores a built-in program such as a basic input/output system (BIOS) and data. The RAM 205 is a temporary memory area used as a work area for operating the CPU 203. The secondary storage device 206 is an external storage device typified by a hard disk drive (HDD) which stores an operating system (OS) being a basic software program and other software programs.

Figure 3:
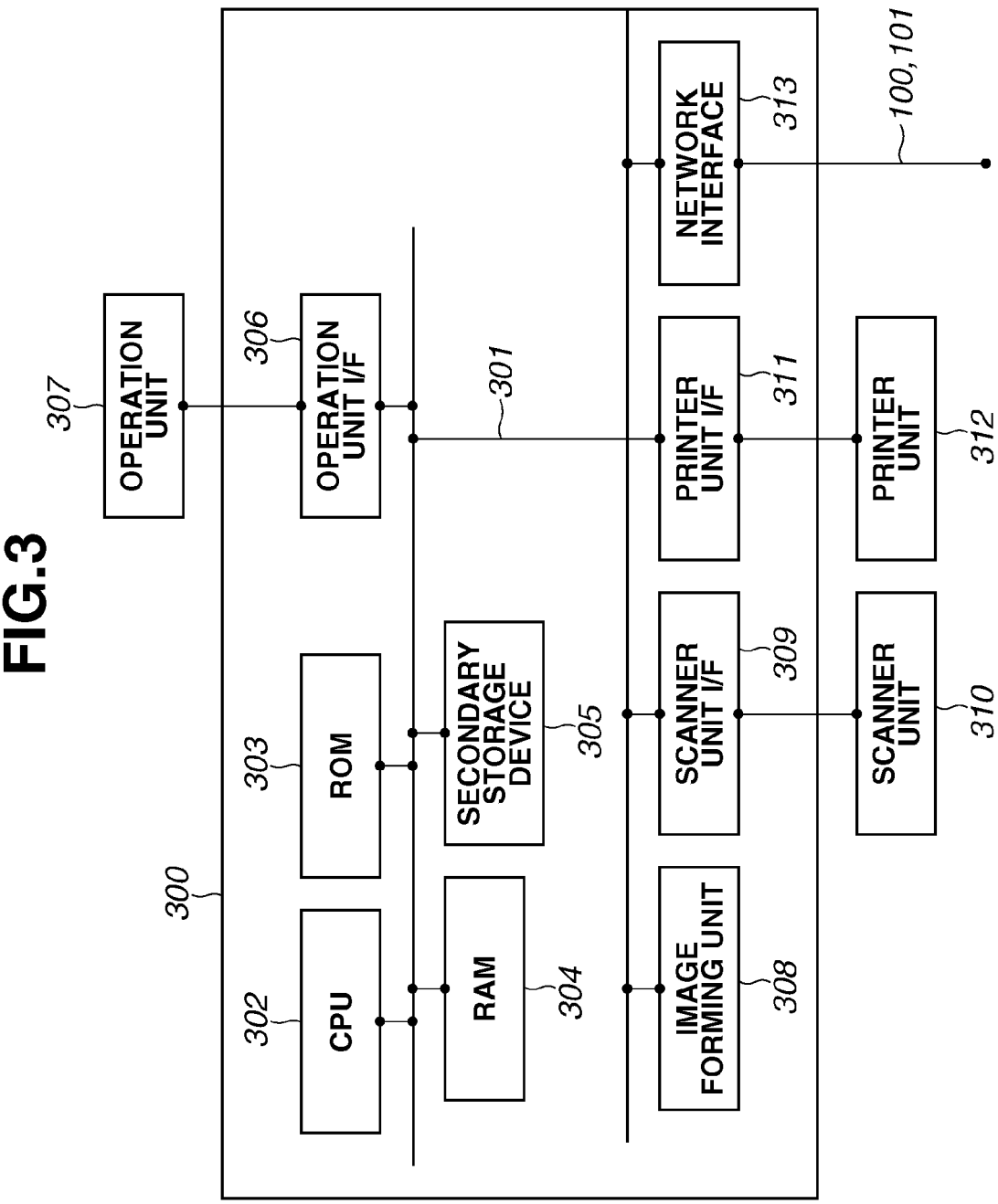
FIG. 3 is a block diagram illustrating a hardware configuration of a multifunction peripheral (MFP).

FIG. 3 is a block diagram illustrating a hardware configuration of the MFP 104 illustrated in FIG. 1. A controller 300 is electrically connected to an operation unit 307, a scanner unit 310, and a printer unit 312. The controller 300 is also connected to the Internet 100 and the LAN 101 via a network interface 313.

A system bus 301 connects the components of the controller 300 with one another. A CPU 302 comprehensively controls access to the PCs and the MFPs connected via the LAN 101 and from the other apparatuses based on the control program stored in a ROM 303. The CPU 302 also directly or indirectly controls the components of the controller 300 connected by the system bus 301. Control performed by the CPU 302 includes the execution of the program for realizing a flow chart of the present exemplary embodiment described below.

The ROM 303 is a read only memory device that stores a boot program of the apparatus. A RAM 304 is a main storage device used for temporarily storing a work area for operating the CPU 302 and image data. The RAM 304 is also used as a temporal memory for reading a software module for realizing the present exemplary embodiment. A secondary storage device 305 is an auxiliary storage device capable of storing system software and image data. An operation unit I/F 306 is an interface unit for connecting the system bus 301 with the operation unit 307. The operation unit I/F 306 receives image data for displaying the image data on the operation unit 307 from the system bus 301, outputs the image data to the operation unit 307 and outputs information input from the operation unit 307 to the system bus 301.

The operation unit 307 is an input/output device including a touch panel display. The operation unit 307 has a function to display information for a user using the MFP 104 and receive input from the user. An image forming apparatus 308 performs direction conversion, image compression, and decompression processing of image data. A scanner unit I/F 309 subjects the image data received from the scanner unit 310 to correction, processing, and editing. The scanner unit 310 is an image input apparatus for reading the image of a document placed on a document reading plate (not illustrated) of the MFP 104. A printer unit I/F 311 receives the image data sent from the image forming apparatus 308, and performs image forming processing on the image data with reference to the attribute data attached to the image data. After the image forming processing is performed, the image data are output to the printer unit 312. The printer unit 312 is an image output apparatus for forming the image data received from the controller 300 via the printer unit I/F 311 on a sheet as a print image. The printer unit 312 determines a rate at which the image data are formed on the sheet as the print image according to the value of column of a continuous copying speed 704 managed with an MFP information management table 700 of an MFP information management unit 503 described below. The network interface 313 connects the Internet 100, the LAN 101, and the system bus 301 to input/output information.

FIG. 4 is a block diagram illustrating a configuration of a software module of the license management server 102 according to the license management of the first exemplary embodiment. The program of the software module is stored in the secondary storage device 206 of the license management server 102 and executed by the CPU 203 to realize the functions.

A control unit 400 controls the entire license management server 102 to perform the instruction and management of the components of the software module. A reception unit 401 performs reception processing of a request for issuing a license from the PC 103 connected via the internet 100. The request for issuing a license is data transmitted from the PC 103 to the license management server 102 at the time of acquiring a license for bringing the software of the extended function installed on the MFP into an executable state. The request for issuing a license is composed of a license number corresponding to the license to be acquired and a device number by which the MFP is uniquely identified.

The license is data storing various pieces of information required for bringing the software of the extended function installed on the MFP 104 into an executable state. In the present exemplary embodiment, the license is defined as data having the data structure illustrated in FIG. 8. A license authentication unit 507 of the MFP 104 reads the license to bring the extended function corresponding to information stored in the license into an executable state. The series of processing is described below.

The license number is information for uniquely identifying the software of the extended function which is installed on the MFP 104 and can be executed by the license. A license issuance determination unit 403 acquires information about the software of the extended function to be brought into an executable state with the license number included in the request for issuing the license as a reference and a license issuance unit 404 issues the license. The series of processing is described below.

A transmission unit 402 transmits the license to the PC 103 connected thereto via the Internet. The license issuance determination unit 403 determines whether the request for issuing the license received by the reception unit 401 according to the instruction of the control unit 400 is correct as the request for issuing the corresponding license. When the license issuance determination unit 403 determines the request for issuing the license, the license issuance determination unit 403 acquires appropriate information from a device information management unit 405, a software information management unit 406, a product information management unit 407, and a license information management unit 408 and executes the determination processing for issuing the license. The results of the determination processing for issuing the license are sent to the control unit 400.

If the license issuance determination unit 403 determines that the request is true, the license issuance unit 404 issues the license according to instructions of the control unit 400. The device information management unit 405 manages device information stored in the secondary storage device 206 according to the instruction of the control unit 400. The device information is composed of various pieces of information for identifying the MFP in which the software and the license are installed. The device information is managed with a device product information management table 600. The device product information management table 600 is described in detail with reference to FIGS. 6A, 6B, 6C, 6D, 6E, and 6F.

The software information management unit 406 manages software information stored in the secondary storage device 206 according to the instruction of the control unit 400. The software information is composed of various pieces of information for identifying the software installed in the MFP. The software information is managed with a software basic information management table 610 and a continuous copying speed change software information management table 620. The product information management unit 407 manages software information stored in the secondary storage device 206 according to the instruction of the control unit 400. A software product information is the one that is units of issuing the license number and the license and associates software information with device information. The product information is managed with a product information management table 630.

The license information management unit 408 manages license information stored in the secondary storage device 206 according to the instruction of the control unit 400. The license information is composed of various pieces of information for identifying the license number and the license. The license information is managed with a license number information management table 640 and a license information management table 650.

FIG. 5 is a block diagram illustrating a configuration of a software module of the MFP 104 related to the license management according to the first exemplary embodiment. The program of the software module is stored in the secondary storage device 305 of the MFP 104 and the CPU 302 executes the program.

A control unit 500 controls the entire MFP 104 to perform instruction and management for the components of the software module. A reception unit 501 receives a license installation request from the PC 103 connected to the MFP 104 via the LAN 101 or a license installation request from the operation unit 307 of the MFP 104. The received license installation request is processed by a license authentication unit 507 according to the instruction of the control unit 500.

The term "license installation request" is a request transmitted by a user of the MFP 104 when the software of the extended function installed at the time of manufacturing the MFP 104 at a factory is brought into an executable state by the MFP 104. The license installation request includes a license 800 described below. The license authentication unit 507 changes the status of MFP software information agreeing with the value of a function ID 802 of a license 800 in the data of an MFP software information management table 720 to "enabled" to bring the software of the extended function of the corresponding MFP 104 into an executable state.

The reception unit 501 receives a license disabling request from the PC 103 connected via the LAN 101 or the license disabling request from the operation unit 307 of the MFP 104. The received license disabling request is processed by the license authentication unit 507 according to the instruction of the control unit 500.

The term "license disabling request" is a request transmitted by the user of the MFP 104 when the software of the extended function brought into an executable state by the MFP 104 is brought into an inexecutable state. The extended function of the MFP 104 is brought into an inexecutable state when the extended function does not need to be used any longer or the extended function is brought into an executable state by a different MFP. The license disabling request includes a function ID indicating the extended function to be brought into an inexecutable state. The license authentication unit 507 changes the status of MFP software information agreeing with the value of the function ID 802 among the data of the MFP software information management table 720 to "disabled" to bring the software of the extended function of the corresponding MFP 104 into an inexecutable state.

The license authentication unit 507 deletes the license information agreeing with the value of the function ID among the data of a license information management table 730. If the license information is deleted, a license issuance unit 506 issues a disabling license 1500 and returns a response to the license disabling request to the user of the MFP 104 via a transmission unit 502. A detailed processing is described in steps S1602 and S1603. The series of processing brings the corresponding extended function into an inexecutable state by the MFP 104 and the license information is also deleted.

The disabling license 1500 is data proving that the license information of the software for using the extended function of the MFP 104 installed in the MFP is deleted from the MFP 104 and the statue of software of the extended function is brought into a disabling state. The license management server 102 reads the data, corrects the data generated and registered when the license management server 102 issues the license to the MFP in the past, and maintains the consistency of data between the license management server 102 and the MFP 104. This is described in detail in FIG. 15.

The user of the MFP 104 transmits the received disabling license 1500 to the license management server 102. The license information management unit 408 deletes the license information agreeing with the value of the license ID among the data of the license information management table 650. The license information management unit 408 changes a license issuance status 643 of the license number information agreeing with the value of a license number 652 of the deleted license information among the data of the license number management table 640 to "unissued." The processing is described in detail below in step S1114. The series of processing enables the software of the corresponding extended function to be reissued.

The transmission unit 502 transmits results of the license installation request and the license disabling request which are processed by a license authentication unit 507 to the PC 103 or the operation unit 307 of the MFP 104 connected via the LAN 101. The MFP information management unit 503 manages MFP information stored in the secondary storage device 305 according to the instruction of the control unit 500. The MFP information is updated by various kinds of setting information required for uniquely identifying the MFP. The MFP information is managed with the MFP information management table 700. The MFP information management table 700 is described in detail below with reference to FIGS. 7A, 7B, 7C, 7D, and 7E.

A basic function information management unit 504 manages the basic function information of the MFP stored in the secondary storage device 305 according to the instruction of the control unit 500. The basic function information is formed of various pieces of information related to the continuous copying speed change function among the basic function information of the MFP. The basic function information is managed with a basic function information management table 710.

An MFP software information management unit 505 manages software information which is stored in the secondary storage device 305 according to the instruction of the control unit 500 and installed in the MFP. The MFP software information includes various pieces of information related to the software installed in the MFP and information identifying whether a license corresponding to the software is installed. The MFP software information is managed with an MFP software information management table 720. More specifically, if the license corresponding to the appropriate software is installed, the value of the status 724 is given "enabled." If the license corresponding to the appropriate software is not installed, the value of the status 724 is given "disabled."

A license information management unit 506 manages related information of the license corresponding to the software of the extended function which is stored in the secondary storage device 305 according to the instruction of the control unit 500 and installed in the MFP. The information related to the license managed by the license information management unit 506 includes two types of information. One is license information which performs management with the data of the license 800 included in the license installation request received by the reception unit 501 being associated with date and time information when the license installation request is received. The license information is managed with the license information management table 730. The other is a license installation history which performs management with the license information associated with date and time information when the license installation request received by the reception unit 501 is processed or date and time information when the license disabling request is processed. The license installation history is managed with a license installation history management table 740.

The license authentication unit 507 processes the license issued by the license management server 102 and brings the software corresponding to the MFP 104 into a usable state. The license authentication unit 507 executes license disabling processing required for moving the license installed in the MFP to a different MFP. The license authentication processing and the license disabling processing in the MFP according to the present exemplary embodiment are described below.

FIGS. 6A, 6B, 6C, 6D, 6E, and 6F are tables illustrating a data structure of information managed by the device information management unit 405, the software information management unit 406, the product information management unit 407, and the license information management unit 408 of the license management server 102.

A device product information management table 600 is a table for managing a device product information in the device information management unit 405. The device product information is the one that collectively defines the data related to the model information of the MFP manufactured and shipped at a factory. The device product information is registered in the license management server 102 before the MFP is manufactured at the factory. When the MFP is manufactured at the factory, the data of the device product information are set to the MFP information management table 700 stored in the secondary storage device 305 of the MFP and the MFP is shipped. For example, the data of a model column 603, a range number column 604, a continuous copying speed column 606 are set to corresponding columns of the MFP information management table 700.

The device product information management table 600 includes a device product ID column 601, a device product name column 602, a model column 603, a range number column 604, a continuous copying speed setting column 605, and a continuous copying speed column 606. The device product ID column 601 is a column that stores a device product ID for uniquely identifying the device product information.

The device product name column 602 is a column that stores the product name of a device product. The device product name is a value displayed on a license installation screen illustrated in FIG. 10. The model column 603 and the range number column 604 are values for storing information defining a range of a possible value as a device number 653 for uniquely identifying the MFP. The device number 653 is a number consisting of eight characters in which three alphabets are added to five numerals. The model column 603 is a column that stores values defining three head alphabets among the values consisting of the device number 653. The range number column 604 is a column that stores the value defining a possible range of five tail numerals among the values consisting of the device number 653. For example, for a device product ID, if "AAA" is stored in the model column 603 and "00000 to 99999" are stored in the range number column 604, which means that there are 100,000 possible device numbers in total.

The continuous copying speed setting column 605 is a column that stores information as to whether the MFP can install the license corresponding to the software for changing the continuous copying speed. The column stores any value of "optional," "essential," and "unnecessary" not only on the basis of whether the MFP can install the license of the software of the extended function for changing the continuous copying speed, but also on the basis of when the license is installed. If the MFP cannot install the license corresponding to the software for changing the continuous copying speed, the value of "unnecessary" is stored. More specifically, that corresponds to the MFP in which the software of the extended function for changing the continuous copying speed is not installed at the factory shipment.

If the MFP can install the license corresponding to the software for changing the continuous copying speed and the license is installed after the factory shipment, the value of "optional" is stored. In this case, the value of the lowest speed in the possible continuous copying speeds of the corresponding MFP is stored in the continuous copying speed column 605 of the MFP at the factory shipment. If the MFP can install the license corresponding to the software for changing the continuous copying speed and the license needs to be installed after the factory shipment, the value of "essential" is stored. In this case, the MFP does not operate unless the license corresponding to the software for changing the continuous copying speed is installed.

The continuous copying speed column 606 is a column that stores the value of the continuous copying speed of a device product. If the value of the continuous copying speed setting column 605 of the corresponding device product is "essential," the column 606 is blank. Only if the value of the continuous copying speed setting column 605 of the corresponding device product is "optional" or "unnecessary," a value is stored. If the value of the continuous copying speed setting column 605 of the corresponding device product is "optional," the value of the lowest speed in the possible continuous copying speeds which can be set to a device product is stored.

The software basic information management table 610 is a table that is used to manage the basic information of the extended function software of the MFP which is enabled such that the software information management unit 406 installs the license issued by the license management server 102. The data of the software basic information management table 610 are registered in the license management server 102 before the MFP is manufactured in a factory. The extended function software of the MFP corresponding to the registered data is installed at the time of manufacturing the MFP.

A function ID column 611 is a column that stores the function ID for uniquely identifying the extended function software. The value stored in the device product ID column 601 is a value used to define the extended function enabled by installing the license to be issued in the license management server 102. A function name column 612 is a column that stores the software name of the extended function software. The software name is a value displayed on a license installation screen illustrated in FIG. 10. A function type column 613 is a column that stores the type information of the extended function software. If the extended function software is normal, the value of "OPTION" is stored. If the extended function software is software for changing the continuous copying speed of the MFP, the value of "PPM" is stored.

The continuous copying speed change software information management table 620 is a table that is used to manage the information of the software for changing the continuous copying speed by installing the license among the extended function software of the MFP in the software information management unit 406. A function ID column 621 is a column that stores the function ID of the extended function software for changing the continuous copying speed. The value stored in the function ID column 621 is the value of the function ID column 611 of the extended function software in which the value of the function type column 613 in the software basic information management table 610 is "PPM."

A continuous copying speed column 622 is a column that stores the value of the continuous copying speed of the MFP changed after the license of the extended function software for changing the continuous copying speed is installed. A post-change model column 623 is a column that stores the value of model of a device number changed after the license of the extended function software for changing the continuous copying speed is installed.

A product information management table 630 is a table that is used to manage the product information of the extended function software of the MFP enabled by installing the license to be issued in the license management server 102. The product information management table 630 includes a product ID column 631, a product name column 632, a function ID column 633, and a device product ID column 634.

In the license management server 102, the issuance and management of the license are performed in units of the product information managed here. The extended function software is sold to users in units of the product information.

A product ID column 631 is a column that stores a product ID for uniquely identifying product information. A product name column 632 is a column that stores the product name of the extended function software. The product name is a value displayed on the license installation screen illustrated in FIG. 10. A function ID column is a column that stores the function ID of the extended function software corresponding to a product. The value stored in the product name column 632 is a value of the function ID column 611 corresponding to the extended function software managed in the software basic information management table 610. A device product ID column 634 is a column that stores the device product ID for identifying the MFP capable of installing the license of the extended function software corresponding to the product. The license of the extended function software corresponding only to the device product managed with the device product information management table 600 agreeing with the value stored in the column 634 can be installed.

A license number information management table 640 is a table that is used to manage the information of a license number in the license information management unit 408. The license number is information issued by the license management server 102. The license number is previously issued and normally distributed to the user of the extended function software of the MFP. The user of the extended function software of the MFP transmits the license issuance request to the license management server 102 from the PC 103 to acquire the license. A series of flow for the user of the extended function software of the MFP acquiring the license is described below.

A license number column 641 is a column that stores a license number being any value for uniquely identifying a purchaser of an extended function software product managed with the product information management table 630. A license number is generated each time the extended function software product is purchased. As long as the license number is a unique value, its format is not limited. In the present exemplary embodiment, the license number is composed of four character strings each having four digits and a combination of 26 alphabets and 10 numerals. A product ID column 642 is a column that stores the product ID of the extended function software product corresponding to the license number. More specifically, the value of the product ID column 631 corresponding to the extended function software product is stored.

A license issuance status column 643 stores a value indicating a status as to whether the license management server 102 issued the license to the user of the extended function software product. If the license management server 102 issued the license to the user, the value of "issued" is stored. If the license management server 102 has not yet issued the license to the user, the value of "unissued" is stored. If the value of the license issuance status column 643 is "unissued," the license management server 102 does not accept the license issuance request from the user.

The license information management table 650 is a table that is used to manage information of the license issued by the license management server 102 in the license information management unit 408. The license information management table 650 includes a license ID column 651, a license number column 652, a device number column 653, a product ID column 654, and a device product ID column 655. The data managed with the license information management table 650 are registered when the license management server 102 receives the license issuance request from the PC 103 and issues the license. The flow related to the issuance of the license is described below.

The license ID column 651 stores any value for uniquely identifying the license issued by the license management server 102. The license number column 652 is a column that stores the license number included in the license issuance request received by the license management server 102. The device number column 653 is a column that stores the device number included in the license issuance request received by the license management server 102. The product ID column 654 is a column that stores the product ID of the extended function software product corresponding to the license number stored in the device number column 653. The device product ID column 655 is a column that stores the device product ID of the device product corresponding to the device number stored in the device number column 653.

FIGS. 7A, 7B, 7C, 7D, and 7E are tables illustrating a data structure of information managed by the MFP information management unit 503, the basic function information management unit 504, the MFP software information management unit 505, and the license information management unit 506 of the MFP 104.

The MFP information management table 700 is a table for managing information about the MFP 104 in the MFP information management unit 503. A device name column 701 is a column that stores a device name set by the user of the MFP 104. A device number column 702 is a column that stores a device number for uniquely identifying the MFP 104. The device number is stored at the time of factory shipment and cannot be changed by the user of the MFP 104. A continuous copying speed setting column 703 is a column that stores information as to whether the MFP 104 can install the license corresponding to the software for changing the continuous copying speed. A continuous copying speed setting value is stored at the time of factory shipment and cannot be changed by the user of the MFP 104. If the license corresponding to the software for changing the continuous copying speed can be optionally installed in the MFP, a value of "optional" is stored. If the license corresponding to the software for changing the continuous copying speed needs to be essentially installed in the MFP, a value of "essential" is stored. If the license corresponding to the software for changing the continuous copying speed does not need to be installed in the MFP, a value of "unnecessary" is stored. The present exemplary embodiment is directed to the device product with the value of "optional" stored in the continuous copying speed setting column 703.

The license corresponding to the software for changing the continuous copying speed can be installed in the MFP with the value of "optional" stored in the continuous copying speed setting column 703 after the factory shipment. A continuous copying speed column 704 is a column that stores the present continuous copying speed of the MFP 104.

The continuous copying speed change software information management table 710 is a table for managing information about software for changing the continuous copying speed by installing the license among the extended function software of the MFP in the basic function information management unit 504. A function ID column 711 is a column that stores the function ID of the extended function software. The value stored in the function ID column 711 is the value of the function ID column 611 of the extended function software in which the value of the function type column 613 is "PPM" in the software basic information management table 610. A continuous copying speed column 712 is a column that stores the value of the continuous copying speed of the MFP changed after the license of the extended function software for changing the continuous copying speed is installed. A post-change model column 713 is a column that stores the value of the model of the device number changed after the license of the extended function software for changing the continuous copying speed is installed.

The MFP software information management table 720 is a table for managing information about software installed in the MFP 104 in the MFP software information management unit 505. A function ID column 721 is a column that stores the function ID for uniquely identifying the extended function software. The value stored in the function ID column 721 is used for defining the extended function enabled by installing the license issued by the license management server 102. A function name column 722 is a column that stores the software name of the extended function software. The software name is a value displayed on the license installation screen illustrated in FIG. 10. A function type column 723 is a column that stores the type information of the extended function software. For the case of a normal extended function software, the value of "OPTION" is stored therein. For the case of the function software for changing the continuous copying speed of the MFP, the value of "PPM" is stored. A status column 724 is a column that stores a state as to whether the extended function software is enabled or disabled at present. For the extended function software in which the corresponding license is installed, the value of "enabled" is stored in the column. For the extended function software in which the corresponding license is not installed, the value of "disabled" is stored therein.

A license information management table 730 is a table that is used to manage information about the license installed in the MFP 104 in the license information management unit 506. The license information management table 730 is the one that is used to manage the data of a license 800 described below which are associated with information about date and time when the license installation request is processed. The data of the license information management table 730 are registered when the license is installed. A license ID column 731 stores a value for uniquely identifying the license installed in the MFP 104 and the value of the license ID column 651 corresponding to the software product when the license is installed. The function ID column 732 is a column that stores the value for identifying the extended function software of the MFP enabled by installing the license. An installation date-and-time column 733 is a column that stores date and time when the license corresponding to the license ID is installed.

A license installation history management table 740 is a table for managing information about the license installed in and uninstalled from the MFP 104 in the license information management unit 506. The license installation history management table 740 is the one that manages the data of a license 800 described below which are associated with information about date and time when the license installation request is processed or a disabling license issuance request is processed.

The data of the license installation history management table 740 are registered when the license is installed and uninstalled.

A license ID column 741 stores a value for uniquely identifying the license installed in the MFP and the value of the license ID column 651 corresponding to the software product when the license is installed. A function ID column 742 stores a value for identifying the extended function software of the MFP enabled by installing the license. An installation date-and-time column 743 stores date-and-time when the license corresponding to the license ID is installed. An uninstallation date-and-time column 744 stores date-and-time when the license corresponding to the license ID is uninstalled.

FIG. 8 is a table illustrating the data structure of the license installed in the license authentication unit 507 of the MFP 104. The license 800 is issued by the license issuance unit 404 of the license management server 102. The license 800 includes a license ID column 801, a function ID column 802, and a device number column 803. The license ID column 801 stores a value for uniquely identifying the license and the value of the license ID column 651 corresponding to the software product. The function ID column 802 stores a value for identifying the extended function software of the MFP corresponding to the software product. The device number column 803 stores the device number for identifying the MFP in which the license can be installed. In the present exemplary embodiment, the data structure is illustrated in a table form, a method for realizing the license issued by the license management server 102 may use various formats such as a binary file format.

FIG. 23 is a flow chart illustrating a series of processing steps in which the license management server 102 issues the license. A series of processing steps indicated by the flow chart is described below on the assumption that the processing is performed between the license management server 102 and the PC 103. However, the processing is performed also between the license management server 102 and the MFP 104.

In step S2301, the transmission unit 402 transmits a license issuance request screen 1200 to the PC 103 according to the instruction of the control unit 400 of the license management server 102. When the PC 103 receives the license issuance request screen 1200 from the transmission unit 402, the PC 103 displays the license issuance request screen 1200 on the user interface 201. An operator of the PC 103 inputs the license number corresponding to the license to be issued and the device number of the MFP to the license issuance request screen 1200 and transmits a license issuance request 1300 to the license management server 102. In step S2301, the reception unit 401 of the license management server 102 receives the license issuance request 1300 from the PC 103.

Figure 12:
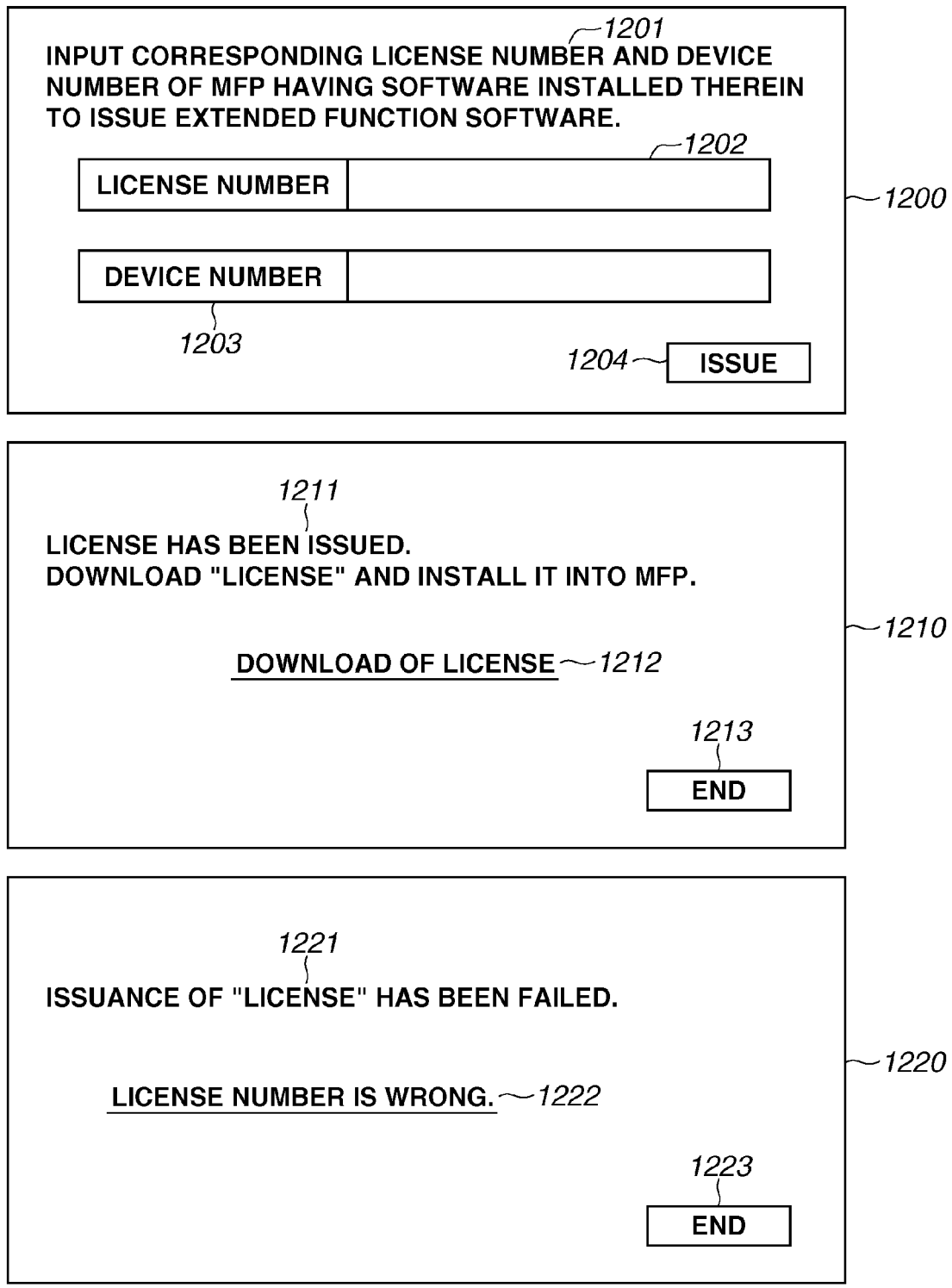
FIG. 12 illustrates a license issuance screen.

FIG. 12 illustrates an example of a license issuance screen which is transmitted from the transmission unit 402 of the license management server 102 and displayed on the user interface 201 of the PC 103 when a series of license issuance operations is performed. The license issuance screen includes the license issuance request screen 1200, a license issuance success screen 1210, and a license issuance failure screen 1220. The license issuance request screen 1200 is a screen operated via the user interface 201 in order that the user of the MFP 104 transmits a request for issuing a license corresponding to the extended function software to the license management server 102. A guidance message display label 1201 is a label that displays message which urges the operator of the PC 103 to input information required for issuing the license. A license number input form 1202 is an input form for receiving the license number corresponding to the license to be issued from the operator of the PC 103 via the user interface 201 of the PC 103. A device number input form 1203 is an input form for receiving the device number of the MFP in which the license to be issued is installed from the operator of the PC 103 via the user interface 201 of the PC 103. A license issuance request transmission button 1204 is a button for starting the transmission of the license issuance request to the reception unit 401 of the license management server 102 when the operator of the PC 103 presses the license issuance request transmission button 1204 via the user interface 201 of the PC 103. The license issuance request is generated by acquiring the data input to the license number input form 1202 and the device number input form 1203 when the license issuance request transmission button 1204 is pressed.

The license issuance success screen 1210 is a screen for transmitting a response to the license issuance request to the user interface 201 when the license management server 102 succeeds in the issuance of the license. The license issuance success screen 1210 includes a guidance message display label 1211, a license acquisition link 1212, and an end button 1213.

The guidance message display label 1211 is a label for displaying a message that notifies the operator of the PC 103 that the license is successfully issued. The license acquisition link 1212 is a link that the user presses via the user interface 201 to allow acquiring the license issued by the license management server 102. The license acquired is stored in the secondary storage device 206 of the PC 103 by pressing the license acquisition link 1212. An end button 1213 is a button for ending a series of operations for issuing the license when pressed by the operator of the PC 103 via the user interface 201 of the PC 103.

The license issuance failure screen 1220 is a screen for transmitting a response to the license issuance request to the user interface 201 when the license management server 102 fails in the issuance of the license. The license issuance failure screen 1220 includes a guidance message display label 1221, a license issuance failure reason display label 1222, and an end button 1223.

FIG. 13 illustrates a data structure of a license issuance request 1300 transmitted to the license management server 102 from the PC 103 via the license issuance request screen 1200 in a table form. The license issuance request 1300 includes a license number column 1301 and a device number column 1302. The license number column 1301 is a column that stores the license number corresponding to the extended function software of the MFP 104. The device number column 1302 is a column that stores the device number for identifying the MFP 104 in which the license is installed.

In step S2302, the license issuance determination unit 403 acquires the license number column 1301 from the license issuance request 1300 received by the reception unit 401. In step S2303, the license issuance determination unit 403 acquires the device number 1302 from the license issuance request 1300 received by the reception unit 401. In step S2304, the license issuance determination unit 403 refers to the license number information management table 640 to confirm whether there exists information about the license number with the same value as the value of the license number 1301 acquired in step S2302. If there exists the information about the license number, the license issuance determination unit 403 acquires the information about the license number with the license number agreeing with the license number 1301 and the processing proceeds to step S2305. If there does not exist the information about the license number, the transmission unit 402 of the license management server 102 transmits the license issuance failure screen 1220 to the user interface 201 of the PC 103 and ends the license issuance processing.

In step S2305, the license issuance determination unit 403 confirms whether the value of the license issuance status 643 of the license number information acquired in step S2304 indicates "unissued." If the value of the license issuance status 643 indicates "unissued" (YES in step S2305), the processing proceeds to step S2306. If the value of the license issuance status 643 indicates "issued" (NO in step S2305), the transmission unit 402 of the license management server 102 transmits the license issuance failure screen 1220 to the user interface 201 of the PC 103 and ends the license issuance processing.

In step S2306, the license issuance determination unit 403 confirms whether the license to be issued from now can be installed in the MFP corresponding to the device number 1302 acquired in step S2303. The license issuance determination unit 403 refers to the device product information management table 600 to acquire information about a device product including the value of the device number 1302 in the range of the device number defined by the model column 603 and the range number column 604. For example, if the value of the device number included in the license issuance request is "AAA12345," and if there are data of the device product information having the values of the model of "AAA" and the range number of "00000 to 12345" or more, the license issuance determination unit 403 may determine that there is the device product information corresponding to the device number.

The license issuance determination unit 403 refers to the product information management table 630 to confirm whether there is the product information having the same value as the value of the product ID column 642 of information about the license number acquired in step S2304. If there is information about the license number, the license issuance determination unit 403 confirms whether the value of the device product ID column 634 agrees with that of the device product ID column 601. If the value agrees therewith, the license issuance determination unit 403 determines that the extended function license can be installed in the MFP with the device number included in the license issuance request and the processing proceeds to step S2307.

In step S2307, the license issuance unit 404 issues the license corresponding to the license issuance request received in step S2301. The license information management unit 408 refers to the license number information management table 640 to acquire the license number information in which the license number acquired in step S2302 agrees with the value of the license number column 641, acquiring the value of the product ID column 642. The license information management unit 408 refers to the product information management table 630 to acquire the product information in which the value of the acquired product ID agrees with the value of the product ID column 631, acquiring the value of the product ID column 634. The license ID generated as a unique value is combined with the acquired license number, device number, product ID, and device product ID to generate the license information and store it in the license information management table 650.

The license issuance unit 404 issues the license 800 based on the license information stored in the license information management table 650. After the license issuance unit 404 issues the license 800, the license information management unit 408 refers to the license number information management table 640 to store the value of "issued" in the license issuance status column 643 of the license number information in which the license number acquired in step S2302 agrees with the value of the license number column 641. The license issued in step S2307 is transmitted to the PC 103 by the transmission unit 402.

Figure 9:
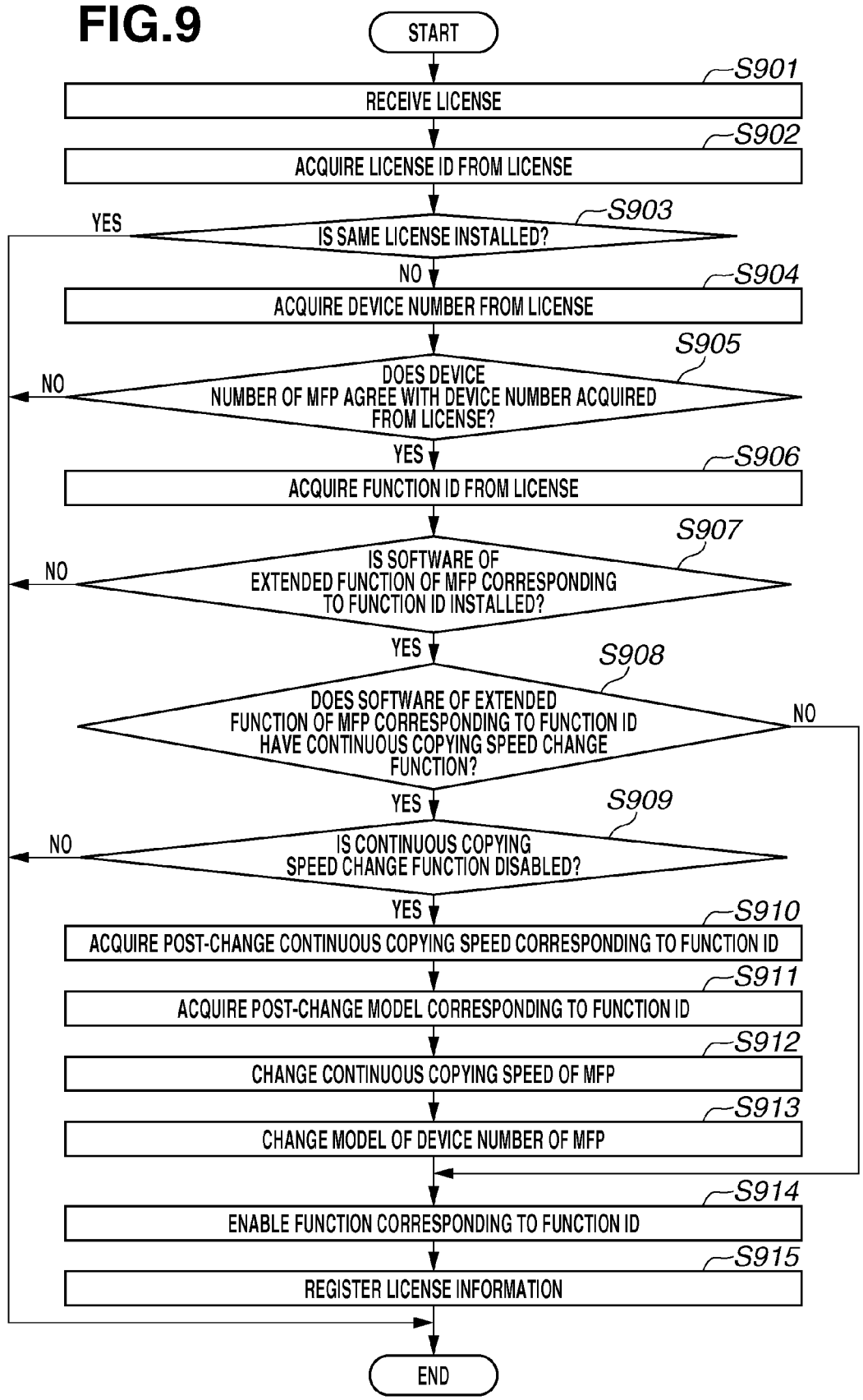
FIG. 9 is a flow chart illustrating a series of operations for installing the license of the extended function for changing the continuous copying speed of the MFP.

FIG. 9 is a flow chart illustrating a series of operations for installing the license of the extended function for changing the continuous copying speed of the MFP 104. The flow chart illustrated in FIG. 9 is executed in the CPU 302 of the MFP 104 and the components execute operations according to the instruction of the control unit 500.

In step S901, the control unit 500 of the MFP 104 displays a license input screen 1000 on the operation unit 307. The reception unit 501 receives the license 800 from the user of the MFP 104 via the license installation screen. In step S901, the license input screen 1000 displayed by the control unit 500 of the MFP 104 may be displayed on the user interface 201 of the PC 103 as well as on the operation unit 307 of the MFP 104.

Figure 10:
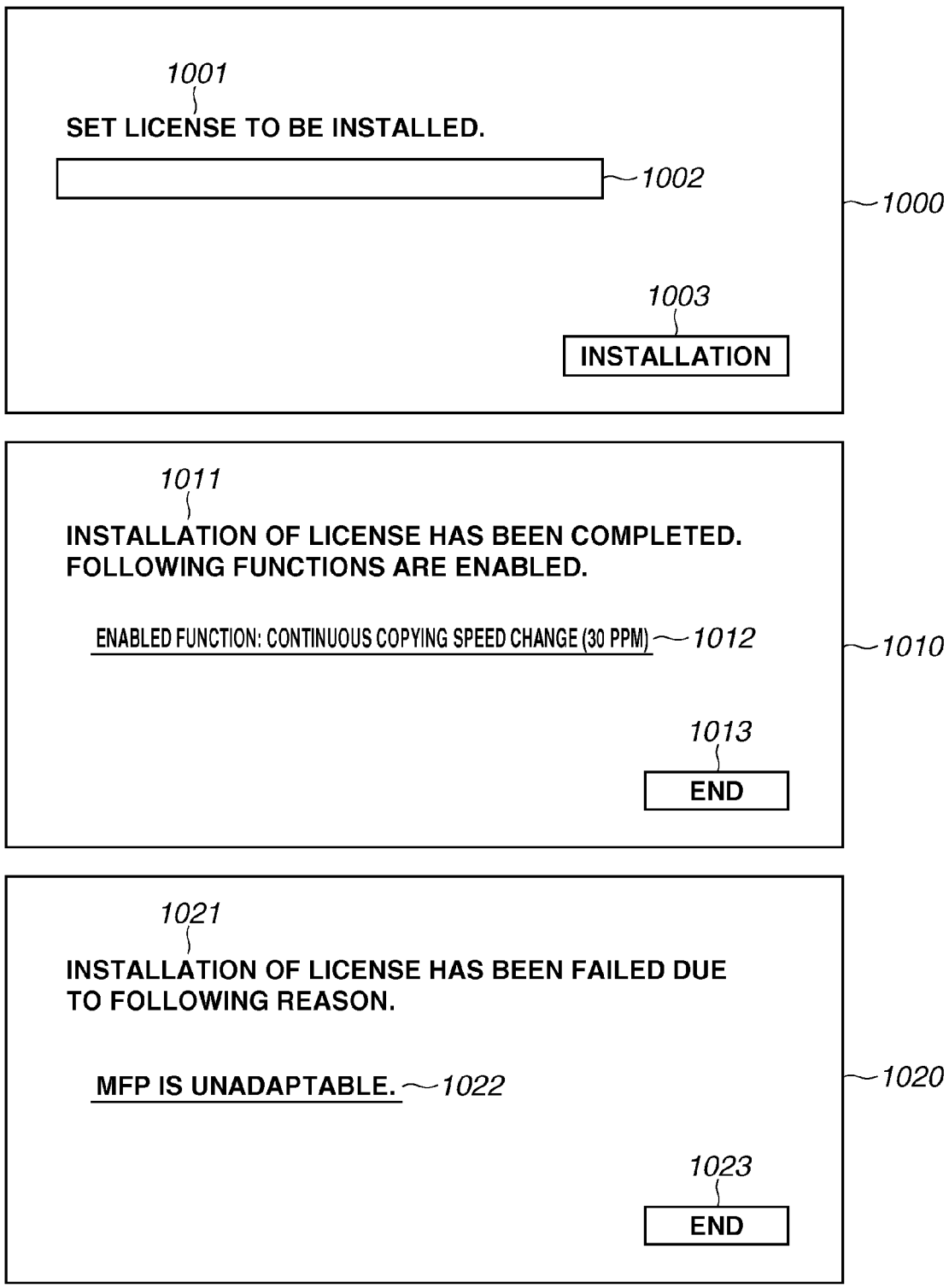
FIG. 10 illustrates a license installation screen.

FIG. 10 illustrates an example of the license installation screen displayed on the operation unit 307 of the MFP 104. The following description is performed on the premise of using the operation unit 307 of the MFP 104. However, the similar screen display and operation are performed also on the user interface 201 of the PC 103. A license input screen 1000 is a screen for displaying a message urging the user of the MFP 104 to input the license and receiving the license 800 from the user via the operation unit 307 of the MFP 104.

A license installation success screen 1010 notifies the user of the MFP 104 of success in installation of the license and displays the information about the extended function software enabled as a result of success in installation of the license. A license installation failure screen 1020 displays a message notifying the user of the MFP 104 of failure in installation of the license. The flow of a series of operations related to the installation of the license is described below.

In step S902, the license authentication unit 507 acquires the license ID 801 from the license 800 received by the reception unit 501 in step S901. In step S903, the license authentication unit 507 confirms whether there are data in which the value of the license ID 801 acquired in step S902 agrees with that of the license ID column 731 among the data of the license information management table managed by the license issuance unit 506. If there are data in which the value of the license ID 801 agrees with that of the license ID column 731 (YES in step S903), the control unit 500 displays the license installation failure screen 1020 on the operation unit 307 of the MFP 104 and ends the installation of the license. If there are no data in which the value of the license ID 801 agrees with that of the license ID column 731 (NO in step S903), the processing proceeds to step S904.

In step S904, the license authentication unit 507 acquires the device number 803 from the license 800 received by the reception unit 501 in step S901. In step S905, the license authentication unit 507 acquires the value of a device number column 702 from the MFP information management unit 503. The license authentication unit 507 compares the value of the device number 803 acquired in step S904 with the value acquired from the device number column 702. If the value of the device number 803 agrees with the value acquired from the device number column 702 (YES in step S905), the processing proceeds to step S906. If the value of the device number 803 does not agree with the value acquired from the device number column 702 (NO in step S905), the control unit 500 displays the license installation failure screen 1020 on the operation unit 307 of the MFP 104 and ends the installation of the license.

In step S906, the license authentication unit 507 acquires the function ID 802 from the license 800 received by the reception unit 501 in step S901. In step S907, the license authentication unit 507 refers to the MFP software information management table 720 managed by the MFP software information management unit 505 to confirm whether the extended function software corresponding to the function ID 802 acquired in step S906 is installed in the MFP 104. If the value agreeing with the function ID 802 is stored in the function ID column 721 of the MFP software information management table 720 (YES in step S907), the license authentication unit 507 determines that the extended function software corresponding to the license 800 is installed in the MFP 104 and the processing proceeds to step S908.

If the value agreeing with the function ID 802 is not stored in the function ID column 721 of the MFP software information management table 720 (NO in step S907), the control unit 500 displays the license installation failure screen 1020 on the operation unit 307 of the MFP 104 and ends the installation of the license. In step S908, the license authentication unit 507 acquires the value of the function type column 723 of the MFP software information agreeing with the function ID 802 in step S907 among the MFP software information managed by the MFP software information management unit 505. If the value of the function type column 723 is the value of "PPM" indicating the continuous copying speed change function, the processing proceeds to step S909. If the value of the function type column 723 is the value of "OPTION" indicating other extended functions, the processing proceeds to step S914.

In step S909, the license authentication unit 507 acquires the value of the status column 724 of the MFP software information agreeing with the function ID 802 in step S907 among the MFP software information managed by the MFP software information management unit 505. If the value of the status column 724 is the value of "disabled" indicating that the license of the continuous copying speed change function is not installed (YES in step S909), the processing proceeds to step S910. If the value of the status column 724 is the value of "enabled" indicating that the license of the continuous copying speed change function is installed (NO in step S909), the control unit 500 displays the license installation failure screen 1020 on the operation unit 307 of the MFP 104 and ends the installation of the license.

In step S910, the license authentication unit 507 refers to the continuous copying speed change software information management table 710 managed by the basic function information management unit 504 to acquire the value of the continuous copying speed column 712 of the continuous copying speed change software information in which the function ID column 711 agrees with the function ID 802. The continuous copying speed is specified by the function ID column 711. In step S911, the license authentication unit 507 refers to the continuous copying speed change software information management table 710 managed by the basic function information management unit 504 to acquire the value of the post-change model column 713 of the continuous copying speed change software information in which the function ID column 711 agrees with the function ID 802.

In step S912, the license authentication unit 507 refers to the continuous copying speed change software information management table 710 managed by the basic function information management unit 504 to acquire the value of the continuous copying speed column 712 of the continuous copying speed change software information in which the function ID column 711 agrees with the function ID 802. The license authentication unit 507 changes the value of the continuous copying speed column 704 of the MFP information managed by the MFP information management unit 503 into the value of the acquired continuous copying speed column 712. The step is described with the assumption of the MFP 104 to which the continuous copying speed has already been set and which is used as an image forming apparatus. However, the MFP which is not used as an image forming apparatus because the continuous copying speed is has not been set is operated as follows. That is to say, the MFP 104 performs processing for newly setting the continuous copying speed which has not yet been set instead of changing the continuous copying speed which has been set at present.

In step S913, the license authentication unit 507 changes the model of value of the device number column 702 acquired in step S905 into the value of the post-change model column 713 acquired in step S911. In step S914, the license authentication unit 507 changes the value of the status column 724 of the MFP software information agreeing with the function ID 802 in step S907 among the MFP software information managed by the MFP software information management unit 505 into "enabled." The above operations change the continuous copying speed at which the printer unit 312 of the MFP 104 forms image data on a sheet as a print image according to the installed license.

In step S915, the license authentication unit 507 stores the data of the license 800 in the license information management table 730 managed by the license information management unit 506. More specifically, the license authentication unit 507 stores the license ID 801 in the license ID column 731, the function ID 802 in the function ID column 732, and the value of date and time when a series of license installation operations illustrated in FIG. 9 is performed in the installation date-and-time column 733. The license authentication unit 507 stores the data of license 800 in license installation history management table 740 managed by the license information management unit 506. The method for storing the data is similar to that for storing the data in the license information management table 730.

As described above, the first exemplary embodiment enables changing the continuous copying speed of the MFP even after factory shipment. Not only the continuous copying speed but also the device number of the MFP is changed. Thereby, a physical device remains unchanged before and after the change, the MFP can be uniquely identified before and after the continuous copying speed is changed.

As described in the first exemplary embodiment, in order that the license of the extended function software is installed in the MFP, the device number of the MFP needs to agree with the device number stored in the license. On the other hand, the installation of the license of the extended function software for changing the continuous copying speed of the MFP changes the device number itself of the MFP. If the license of the extended function software for changing the continuous copying speed is installed in the MFP, and if the license of another different extended function software has been already installed in the MFP, resultantly, the device number of the MFP does not agree with the device number recorded in the license information stored in the MFP. This produces various problems because the MFP to which the license managed by the license management server has been issued is different from the MFP in which the actually issued license is installed.

For example, the license management server has a "license transfer" function to move the license already installed in the MFP to another MFP. The transfer of the license, i.e., a new issuance of the license to another MFP needs to delete both of information about the license already issued by the license management server and information about the license installed in the MFP being the transfer destination. If a difference is produced in the device number associated with the license between the license management server and the MFP, it means that the license is not correctly managed, which may lead to the illegal use of the extended function of the MFP.

Then, in a second exemplary embodiment, there is described a license management method for preventing information about the device number associated with the license from mismatching between the license management server and the MFP even if the license of the extended function for changing the continuous copying speed is installed in the MFP in which several licenses have already been installed to change the device number of the MFP.

Figure 11:
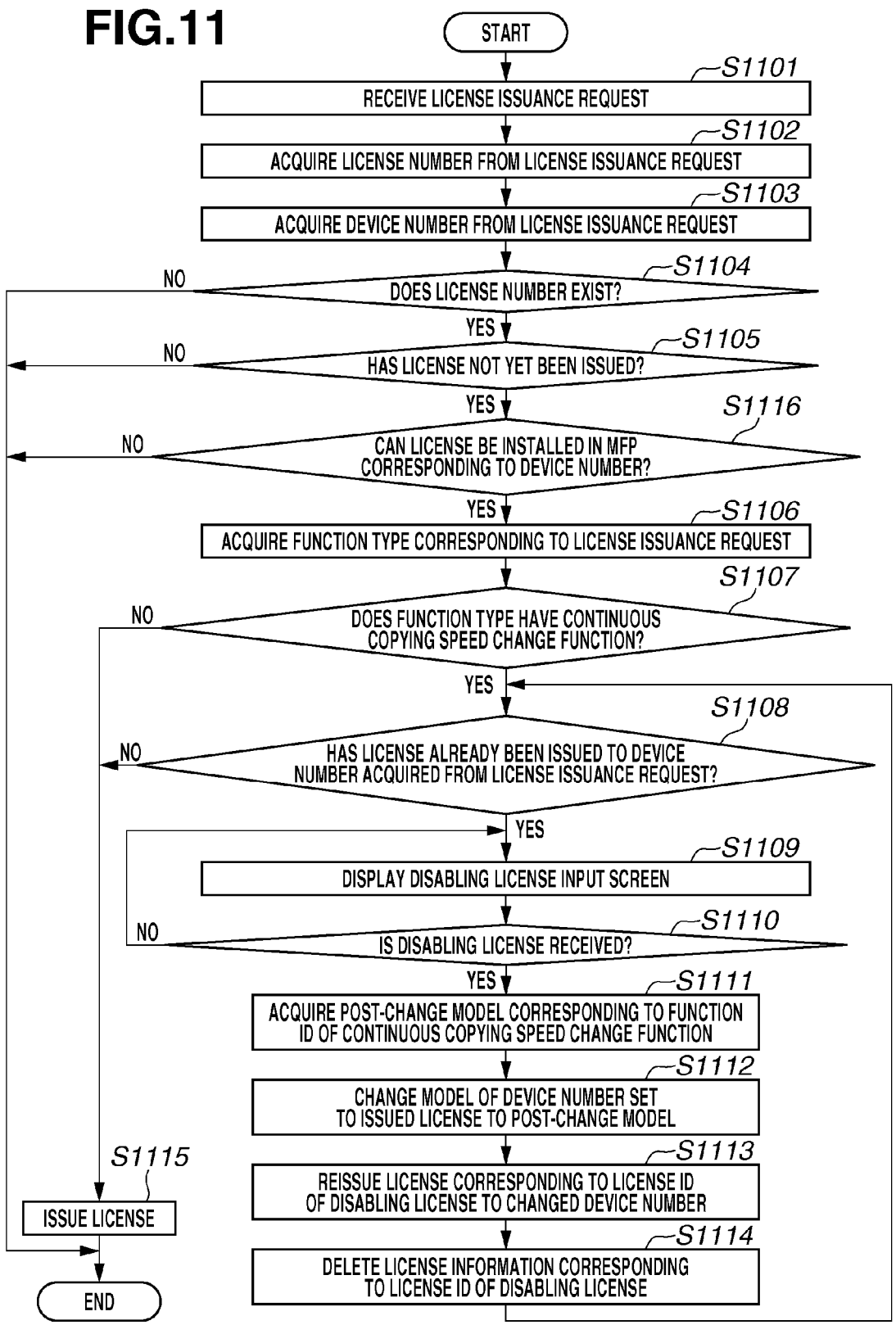
FIG. 11 is a flow chart illustrating a series of operations in which the license management server issues the license.

FIG. 11 is a flow chart illustrating a series of operations in which the license management server 102 issues the license in the second exemplary embodiment. A series of processing steps indicated by the flow chart is described below on the assumption that the processing is performed between the license management server 102 and the PC 103. However, the processing is performed also between the license management server 102 and the MFP 104.

In step S1101, the transmission unit 402 transmits a license issuance request screen 1200 to the PC 103 according to the instruction of the control unit 400 of the license management server 102. When the PC 103 receives the license issuance request screen 1200 from the transmission unit 402, the PC 103 displays the license issuance request screen 1200 on the user interface 201. An operator of the PC 103 inputs the license number corresponding to the license to be issued and the device number of the MFP to the license issuance request screen 1200 and transmits a license issuance request 1300 to the license management server 102. In step S1101, the reception unit 401 of the license management server 102 receives the license issuance request 1300 from the PC 103.

In step S1102, the license issuance determination unit 403 acquires the license number column 1301 from the license issuance request 1300 received by the reception unit 401. In step S1103, the license issuance determination unit 403 acquires the device number 1302 from the license issuance request 1300 received by the reception unit 401.

In step S1104, the license issuance determination unit 403 refers to the license number information management table 640 to confirm whether there exists information about the license number with the same value as the value of the license number 1301 acquired in step S1102. If there exists the information about the license number, the license issuance determination unit 403 acquires the information about the license number with the license number agreeing with the license number 1301 and the processing proceeds to step S1105. If there does not exist the information about the license number, the transmission unit 402 of the license management server 102 transmits the license issuance failure screen 1220 to the user interface 201 of the PC 103 and ends the license issuance processing.

In step S1105, the license issuance determination unit 403 confirms whether the value of the license issuance status 643 of the license number information acquired in step S1104 indicates "unissued." If the value of the license issuance status 643 indicates "unissued" (YES in step S1105), the processing proceeds to step S1116. If the value of the license issuance status 643 indicates "issued" (NO in step S1105), the transmission unit 402 of the license management server 102 transmits the license issuance failure screen 1220 to the user interface 201 of the PC 103 and ends the license issuance processing. In step S1116, the license issuance determination unit 403 confirms whether the license to be issued from now can be installed in the MFP corresponding to the device number 1302 acquired in step S1103. The method is similar to that in step S2306, so that the detail description thereof is omitted.

In step S1106, the license issuance determination unit 403 refers to the product information management table 630 to acquire product information with the product ID agreeing with the value of the product ID 642 of the license number information acquired in step S1104.

If the value of the function type column 613 acquired in step S1106 is "PPM" (YES in step S1107), the license issuance determination unit 403 determines that the received issuance request is the license of the extended function for changing the continuous copying speed and the proceeding proceeds to step S1108. If the value of the function type column 613 is not "PPM" (NO in step S1107), the license issuance determination unit 403 determines that the received issuance request is not the license of the extended function for changing the continuous copying speed and the proceeding proceeds to step S1115.

In step S1108, the license issuance determination unit 403 refers to the license information management table 650 to confirm whether there is the license information with the value agreeing with the license number column 1301 acquired in step S1102 and the device number column 1302 acquired in step S1103.

If there is no license information with the value agreeing therewith (NO in step S1108), the license issuance determination unit 403 determines that problem does not occurs even if the device number of the MFP is changed by installing the license of the extended function for changing the continuous copying speed and the processing proceeds to step S1115. If there is the license information with the value agreeing therewith (YES in step S1108), the license issuance determination unit 403 determines that problem occurs if the device number of the MFP is changed by installing the license of the extended function for changing the continuous copying speed and the processing proceeds to step S1109.

In step S1109, the transmission unit 402 displays a disabling license input screen 1400 on the PC 103 according to the instruction of the control unit 400 of the license management server 102. When the PC 103 receives the disabling license input screen 1400 from the transmission unit 402, the PC 103 displays the disabling license input screen 1400 on the user interface 201. The operator of the PC 103 transmits a specified disabling license to the license management server 102 via the disabling license input screen 1400.

Figure 14:
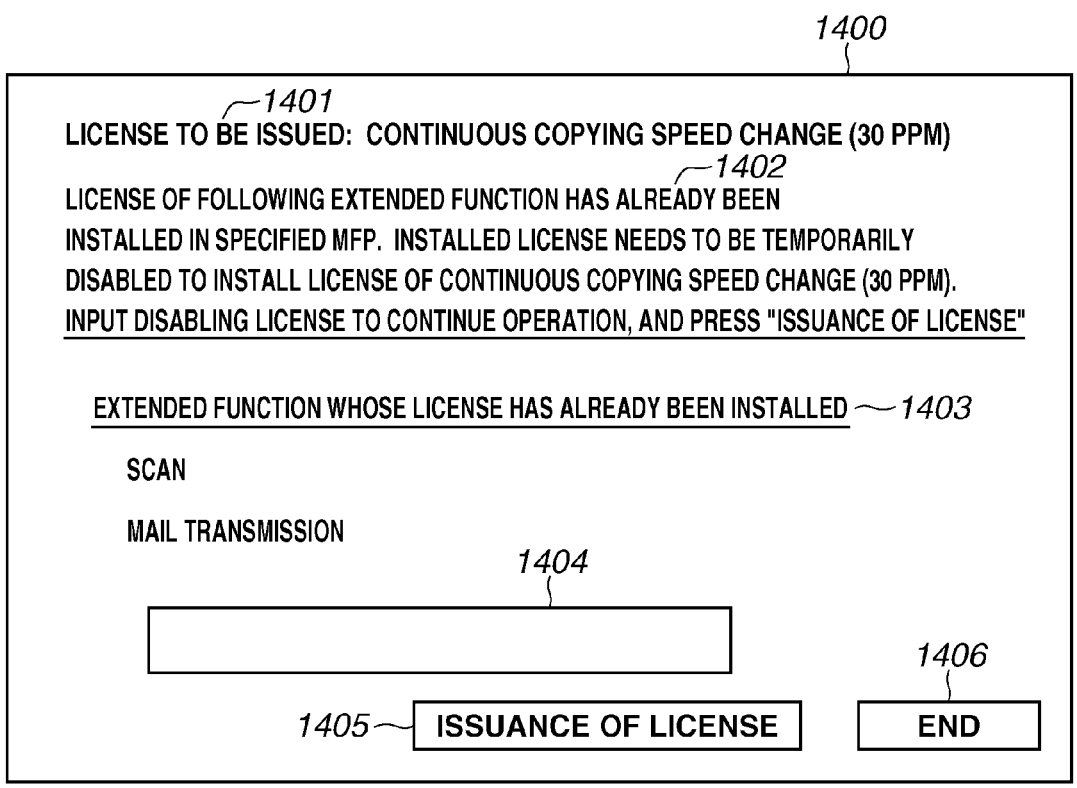
FIG. 14 illustrates a disabling license input screen.

FIG. 14 is an example of the disabling license input screen transmitted from the transmission unit 402 of the license management server 102 and displayed on the user interface 201 of the PC 103 when a series of operations is performed in issuing the license in the present exemplary embodiment.

The disabling license input screen 1400 includes a license-to-be-issued product display label 1401, a guidance message display label 1402, a disabling license-to-be-input display label 1403, a disabling license input form 1404, a license issuance button 1405, and an end button 1406.

The license-to-be-issued product display label 1401 is a label that displays the software product name of the extended function software to which the license is issued. In step S1106, the value of the product name column 632 of product information acquired by the license issuance determination unit 403 is displayed. The guidance message display label 1402 is a label that gives the operator of the PC 103 a message that the disabling license 1500 needs to be input to continue the issuance operation of the license. The disabling license-to-be-input display label 1403 is a label that displays a list of the software product name corresponding to the disabling license which needs to be input. The product information management table 630 displays the product name of the product information with the product ID agreeing with the value of the product ID 654 of the license information acquired in step S1108.

The disabling license input form 1404 is an input form for receiving the disabling license 1500 from the user of the PC 103 via the user interface 201 of the PC 103. The license issuance button 1405 is pressed by the user of the PC 103 via the user interface 201 of the PC 103 to transmit the disabling license 1500 from the PC 103 to the license management server 102. When the license issuance button 1405 is pressed, the processing proceeds to step S1110. The end button 1406 is pressed by the user of the PC 103 via the user interface 201 of the PC 103 to end a series of operations for issuing the license.

Figure 16:
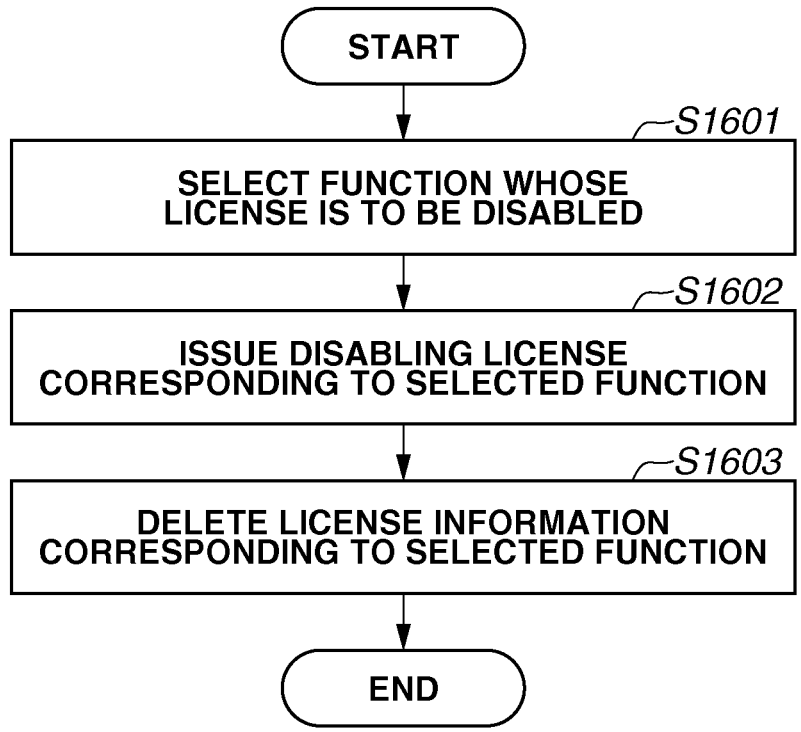
FIG. 16 is a flow chart illustrating a series of operations in which the MFP 104 issues the disabling license.

FIGS. 15 to 17 illustrate the disabling license 1500 to be transmitted to the license management server 102 in step S1109. FIG. 15 is a table illustrating the data structure of the disabling license 1500 to be transmitted to the license management server 102 in step S1109. The disabling license 1500 is called by the license information management unit 506 of the MFP 104. The disabling license 1500 includes a license ID column 1501, a function ID column 1502, and a device number 1503.

The license ID column 1501 stores a license ID corresponding to a function disabled by the extended function of the MFP 104. The function ID column 1502 stores a function ID corresponding to a function disabled by the extended function of the MFP 104. The device number 1503 stores a device number that is the value for uniquely identifying the MFP 104 which issues the disabling license. In the present exemplary embodiment, the data structure is illustrated in a table form, a method for realizing the disabling license may use various formats such as a binary file format.

FIG. 16 is a flow chart illustrating a series of processing steps in which the MFP 104 issues the disabling license which needs to be transmitted to the license management server 102 in step S1109. In step S1601, the control unit 500 of the MFP 104 displays a disabling license selection screen 1700 on the operation unit 307. The user of the MFP 104 operates a license selection screen displayed on the operation unit 307 to select the extended function of the MFP 104 to be disabled.

FIG. 17 illustrates an example of a disabling license issuance screen displayed on the operation unit 307 of the MFP 104 in the present exemplary embodiment. The following description is performed on the premise of using the operation unit 307 of the MFP 104. However, the similar screen display and operation may be performed also on the user interface 201 of the PC 103.

The disabling license issuance screen includes the disabling license selection screen 1700 and a disabling license issuance success screen 1710. A guidance message display label 1701 is a label that urges the user of the MFP 104 to select the extended function of the MFP to which the disabling license is issued. A "label for displaying a function to which the disabling license is issued" 1702 is a label for listing the product name of the extended function software enabled by the MFP 104. The label 1702 displays the value of the product name column 722 of data that the value of the status column 724 is "enabled" and the value of the function type column 723 is "OPTION" among the MFP software managed with the MFP software information management table 720.

A function selection check box 1703 is a check box pressed to select the extended function software to which the disabling license is issued. The operator of the MFP 104 presses a disabling license issuance button 1704 via the user interface 201 of the MFP 104 to start the transmission of the disabling license issuance request to the license authentication unit 507 of the MFP 104. The processing for the disabling license issuance request is started at the time of pressing the disabling license issuance button 1704.

The disabling license issuance success screen 1710 is displayed on the operation unit 307 when the MFP 104 succeeds in issuing the disabling license. A guidance message display label 1711 is a label that displays a message for notifying the operator of the MFP 104 that the disabling license is successfully issued. The user presses a license acquisition link 1712 via the operation unit 307 to enable acquiring the license issued by the MFP 104. The license acquired by pressing the license acquisition link 1712 is stored in the secondary storage device 305 of the MFP 104. The operator of the MFP 104 presses an end button 1713 via the operation unit 307 of the MFP 104 to end a series of operations for issuing the license.

In step S1602, the license authentication unit 507 of the MFP 104 acquires the function ID of the extended function of the MFP selected in step S1601. The license authentication unit 507 refers to the license information management table 730 to change the value of the license ID 731 of data in which the value of the acquired function ID agrees with the value of the function ID column 732 into "disabled." The license authentication unit 507 refers to the license information management table 730 to acquire the value of the license ID 731 of data in which the value of the acquired function ID agrees with the value of the function ID column 732. The values of the acquired license ID, function ID, and the device number column 702 of the MFP information management table 700 are combined to issue the disabling license.

In step S1603, the operation unit 307 of the MFP 104 displays the disabling license issued in step S1602 along with the disabling license issuance success screen 1710. At this point, the license information management unit 506 of the MFP 104 deletes the license information corresponding to the function ID of the extended function of the MFP selected in step S1601 from the license information management table 730. The license information management unit 506 of the MFP 104 stores information about date and time when the disabling license is issued in the uninstallation date-and-time column 744 of license installation history information corresponding to the function ID of the extended function of the MFP selected in step S1601.

In step S1110, the license issuance determination unit 403 confirms whether the disabling license corresponding to the software product displayed on the disabling license-to-be-input display label 1403 via The reception unit 401 in step S1109 is received. If the disabling license is not received or the received disabling license is insufficient (NO in S1110), the processing returns to step S1109 to make a request again for inputting the disabling license. If the disabling license is received (YES in S1110), the processing proceeds to step S1111. In step S1111, the license issuance determination unit 403 refers to the continuous copying speed change software information management table 620 to acquire the value of the post-change model column 623 of the data in which the value of the function ID acquired in step S1106 agrees with the value of the function ID column 621.

In step S1112, the license information management unit 408 refers to the license information management table 650 to acquire the license information in which each data of the disabling license 1500 agrees with the value of the license ID column 651 and the device number column 653. New license information is generated such that the license ID column 651 is changed to a new value based on the acquired license information and the post-change model of value of the device number column 653 is changed into the value acquired in step S1111.

In step S1113, the license issuance unit 404 issues the license of the extended function already installed in the MFP 104 based on the license information newly generated in step S1112. At this point, the license of the extended function is issued with the license corresponding to the device number changed by installing the license of the continuous copying speed change function.

In step S1114, the license information management unit 408 deletes the license information acquired in step S1112 from the license information management table 650. In step S1115, the license issuance unit 404 issues the license corresponding to the license issuance request received in step S1101. Not only the license of software for using the extended function but also the license for changing or newly setting the continuous copying speed of the image forming apparatus are issued. The license in the latter is collectively referred to as the license for setting the continuous copying speed of the image forming apparatus.

The license information management unit 408 refers to the license number information management table 640 to acquire the license number information in which the license number acquired in step S1102 agrees with the value of the license number column 641, acquiring the value of the product ID column 642. The license information management unit 408 refers to the product information management table 630 to acquire the product information in which the value of the acquired product ID agrees with the value of the product ID column 631, acquiring the value of the product ID column 634. The license ID generated as a unique value is combined with the acquired license number, device number, product ID, and device product ID to generate the license information and store it in the license information management table 650.

The license issuance unit 404 issues the license 800 based on the license information stored in the license information management table 650. After the license issuance unit 404 issues the license 800, the license information management unit 408 refers to the license number information management table 640 to store the value of "issued" in the license issuance status column 643 of the license number information in which the license number acquired in step S1102 agrees with the value of the license number column 641. The license issued in steps S1105 and S1113 is provided for the requester, more specifically, transmitted to the PC 103 by the transmission unit 402.

The second exemplary embodiment allows determining problems occurring due to the installation of the license of the extended function for changing the continuous copying speed of the MFP 104 and issuing the license for avoiding the problems.

In the second exemplary embodiment, there is described a method for issuing the license for setting the continuous copying speed while realizing the consistency of the device number information associated with the license between the license management server and the MFP even if several extended functions can be used by the MFP. As described in the second exemplary embodiment, in a case where the license for transferring the license to another MFP is issued using the "license transfer" function, it is necessary to specify the device number of the MFP of both transfer source and destination.

There is considered a case where other licenses of the extended function are transferred if the MFP of transfer destination has a function to change the continuous copying speed but the license is not installed therein. In that case, if the license of function for changing the continuous copying speed is installed in the MFP of transfer destination, the device number of the MFP of transfer destination to be changed needs to be specified again to issue and install the other licenses of the extended function.

In a third exemplary embodiment, there is described a method for managing the license that the issuance of an appropriate license is collectively performed at a one-time license issuance processing in consideration of state of installation of the license of the MFP of the transfer destination in using the "license transfer" function.

Figure 18:
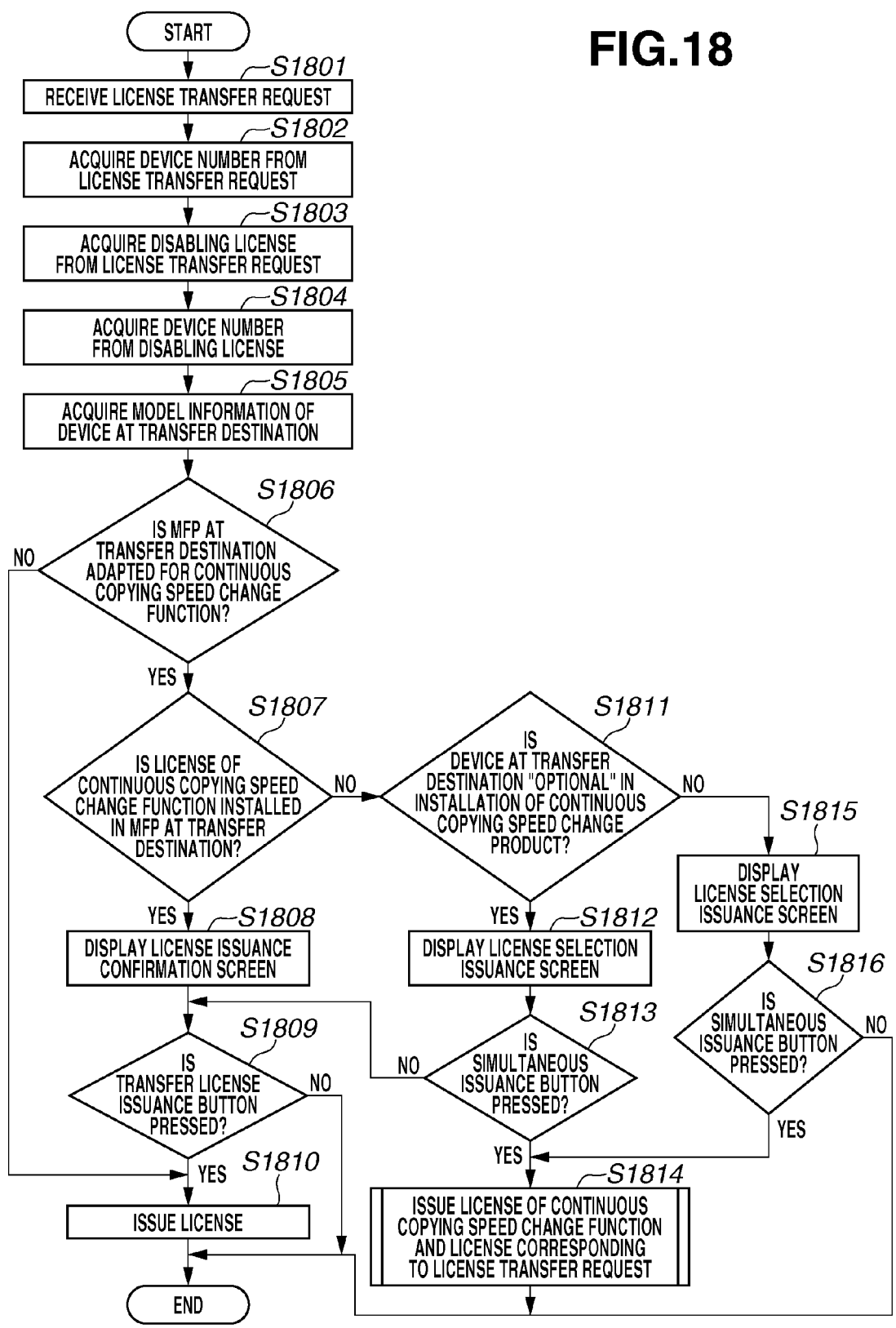
FIG. 18 is a flow chart illustrating a series of operations in which the license management server issues the license.

FIG. 18 is a flow chart illustrating a series of operations in which the license management server 102 issues the license 800. A series of operations illustrated by the flow chart is described below on the assumption that the operations are performed between the license management server 102 and the PC 103. However, the operations are performed also between the license management server 102 and the MFP 104.

In step S1801, the transmission unit 402 transmits a license transfer request 1900 to the PC 103 according to the instruction of the control unit 400 of the license management server 102. When the PC 103 receives the license transfer request 1900 from the transmission unit 402, the PC 103 displays the license transfer request 1900 on the user interface 201. The operator of the PC 103 inputs the device number of the MFP to which the license is transferred and the disabling license acquired from the MFP of the transfer source and transmits the license transfer request 1900 to the license management server 102. In step S1801, the reception unit 401 of the license management server 102 receives the license transfer request 1900 from the PC 103.

Figure 19:
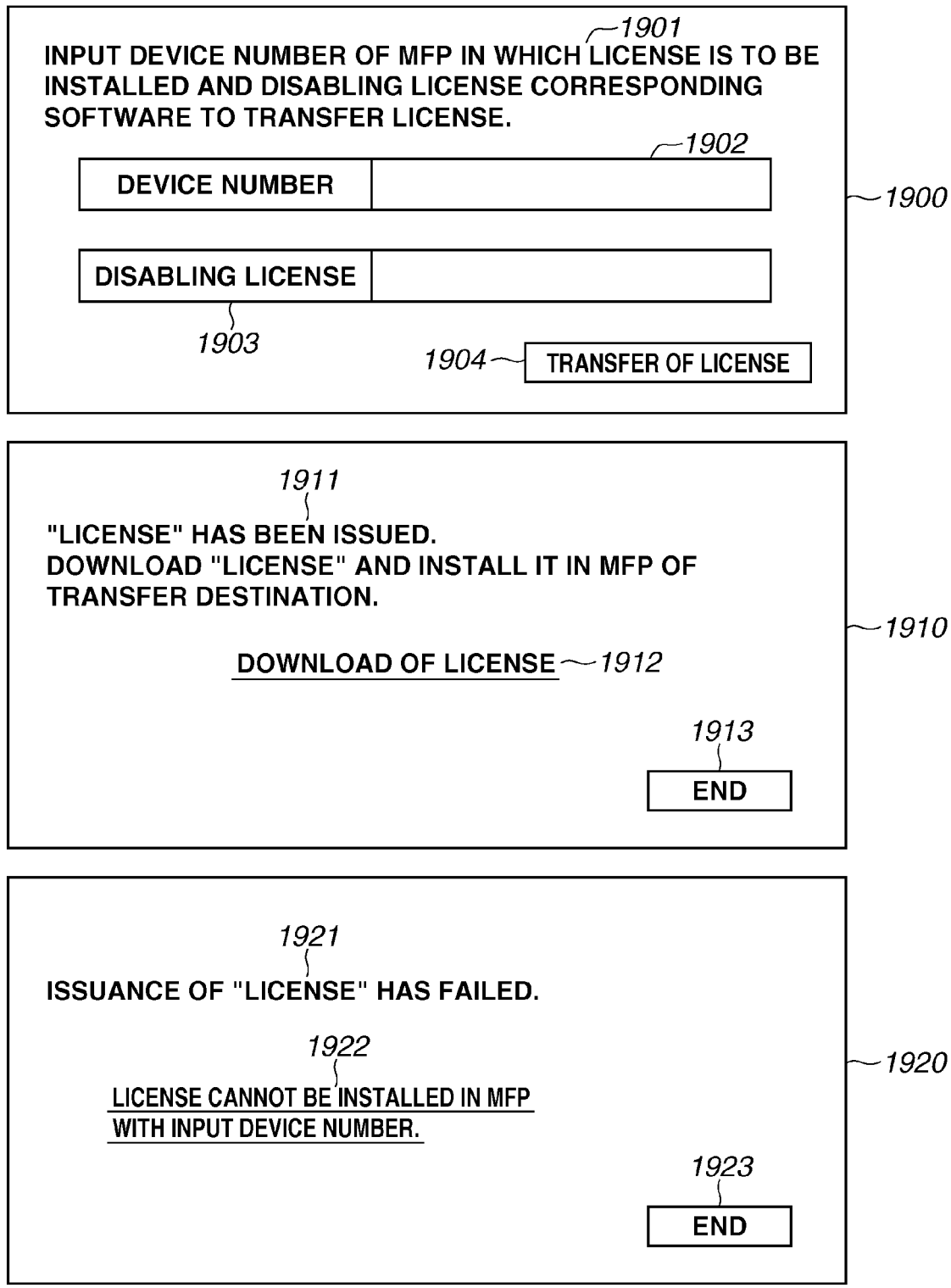
FIG. 19 illustrates license transfer screens.

FIG. 19 illustrates an example of a license transfer screen which is transmitted from the transmission unit 402 of the license management server 102 and displayed on the user interface 201 of the PC 103 when a series of license transfer operations is performed.

The license transfer request 1900 is a screen operated via the user interface 201 in order that the user of the MFP 104 transmits a request for transferring a license corresponding to the extended function software to the license management server 102. A guidance message display label 1901 is a label that displays message which urges the operator of the PC 103 to input information required for transferring the license. A device number input form 1902 is an input form for the operator to the PC 103 receiving the device number of the MFP to which the license is transferred via the user interface 201 of the PC 103.

A disabling license input form 1903 is an input form for the operator of the PC 103 receiving the disabling license acquired from the MFP to which the license is transferred via the user interface 201 of the PC 103. A license transfer request transmission button 1904 is a button for starting the transmission of the license transfer request to the reception unit 401 of the license management server 102 when the operator of the PC 103 presses the license transfer request transmission button 1904 via the user interface 201 of the PC 103. The license transfer request is generated by acquiring the data input to the device number input form 1902 and the disabling license input form 1903 when the license transfer request transmission button 1904 is pressed.

A license transfer success screen 1910 is a screen for transmitting a response to the license transfer request when the license management server 102 succeeds in the issuance of the license which can be installed in the MFP specified as a destination to which the license is transferred. A guidance message display label 1911 is a label for displaying a message that notifies the operator of the PC 103 that the license is successfully issued. A license acquisition link 1912 is a link that the user presses via the user interface 201 to allow acquiring the license issued by the license management server 102. The license acquired is stored in the secondary storage device 206 of the PC 103 by pressing the license acquisition link 1912. An end button 1913 is a button for ending a series of operations for issuing the license when pressed by the operator of the PC 103 via the user interface 201 of the PC 103.

The license transfer failure screen 1920 is a screen for transmitting a response to the license transfer request when the license management server 102 fails in the issuance of the license which can be installed in the MFP specified as a destination to which the license is transferred. A guidance message display label 1921 is a label for displaying a message that notifies the operator of the PC 103 that the license management server 102 fails in the issuance of the license. A license issuance failure reason display label 1922 is a label for displaying a message that notifies the operator of the PC 103 of a detailed reason why the license management server 102 fails in the issuance of the license. An end button 1923 is a button for ending a series of operations for issuing the license when pressed by the operator of the PC 103 via the user interface 201 of the PC 103.

FIG. 20 illustrates the data structure of the license transfer request transmitted to the license management server 102 from the PC 103 via the license transfer request 1900 in a table form. A license transfer request 2000 includes a device number column 2001 and a disabling license column 2002. The device number column 2001 is a column that stores the device number of the MFP to which the license is transferred. The disabling license column 2002 is a column that stores the disabling license acquired from the MFP to which the license is transferred. In FIG. 20, the disabling license column 2002 reads "binary data" as data stored therein. However, a stored data form is not limited to binary data form. Data are not limited as long as data has the structure illustrated in FIG. 15.

In step S1802, the license issuance determination unit 403 acquires the device number 2001 from the license transfer request 2000 received by the reception unit 401. The device number 2001 acquired here is the device number of the MFP to which the license is transferred. In step S1803, the license issuance determination unit 403 acquires the disabling license 2002 from the license transfer request 2000 received by the reception unit 401.

In step 1804, the license issuance determination unit 403 acquires the device number 1503 included in the disabling license 2002 acquired in step S1803. The device number 1503 acquired here is the device number of the MFP which transfers the license. In step S1805, the license issuance determination unit 403 refers to the device product information management table 600 to acquire the device product information with the device number agreeing with the value of the device number 2001 acquired in step S1802. More specifically, the license issuance determination unit 403 acquires the device product information with the value of the model 603 agreeing with top three-digit alphabet of the device number 2001. The license issuance determination unit 403 acquires the device product information with the value of the range number 604 including tail five-digit numeral of the device number 2001 from the device product information. Thus, the license issuance determination unit 403 acquires the value of the continuous copying speed setting column 605 of the device product information agreeing with the acquired device number.

In step S1806, the license issuance determination unit 403 confirms the value of the continuous copying speed setting column 605 acquired in step S1805. If the value of the continuous copying speed setting column 605 is "optional" or "essential," the license issuance determination unit 403 determines that the device number of the MFP being the transfer destination may be changed from the value acquired in step S1802 (YES in step S1806), and the processing proceeds to step S1807. If the value of the continuous copying speed setting column 605 is "unnecessary," the license issuance determination unit 403 determines that the device number of the MFP being the transfer destination is not changed from the value acquired in step S1802 (NO in step S1806), and the processing proceeds to step S1810.

In step S1807, the license issuance determination unit 403 confirms whether the license of the extended function software for changing the continuous copying speed is installed in the MFP with the device number 2001 acquired in step S1802. More specifically, the license issuance determination unit 403 refers to the license information management table 650 to acquire the license information in which the value of the device number 2001 agrees with that of the device number column 653. Then, the license issuance determination unit 403 refers to the product information management table 630 to acquire the product information in which the value of the product ID column 654 agrees with that of the product ID column 631. Then, the license issuance determination unit 403 refers to the software basic information management table 610 to acquire the software basic information in which the value of the function ID column 633 agrees with that of the function ID column 611. The license issuance determination unit 403 confirms the value of the function type column 613 of acquired software basic information. If the value of the function type column 613 is "PPM," the license issuance determination unit 403 determines that the license of the extended function for changing the continuous copying speed is installed in the MFP to which the license is transferred (YES in step S1807), and the processing proceeds to step S1808.

If the value of the function type column 613 is "OPTION," the license issuance determination unit 403 determines that the license of the extended function for changing the continuous copying speed is not installed in the MFP to which the license is transferred (NO in step S1807), and the processing proceeds to step S1811. In step S1808, the transmission unit 402 transmits a license issuance confirmation screen 2100 to the PC 103 according to the instruction of the control unit 400 of the license management server 102. When the PC 103 receives the license issuance confirmation screen 2100 from the transmission unit 402, the PC 103 displays it on the user interface 201 and the processing proceeds to step S1809.

Figure 21A:
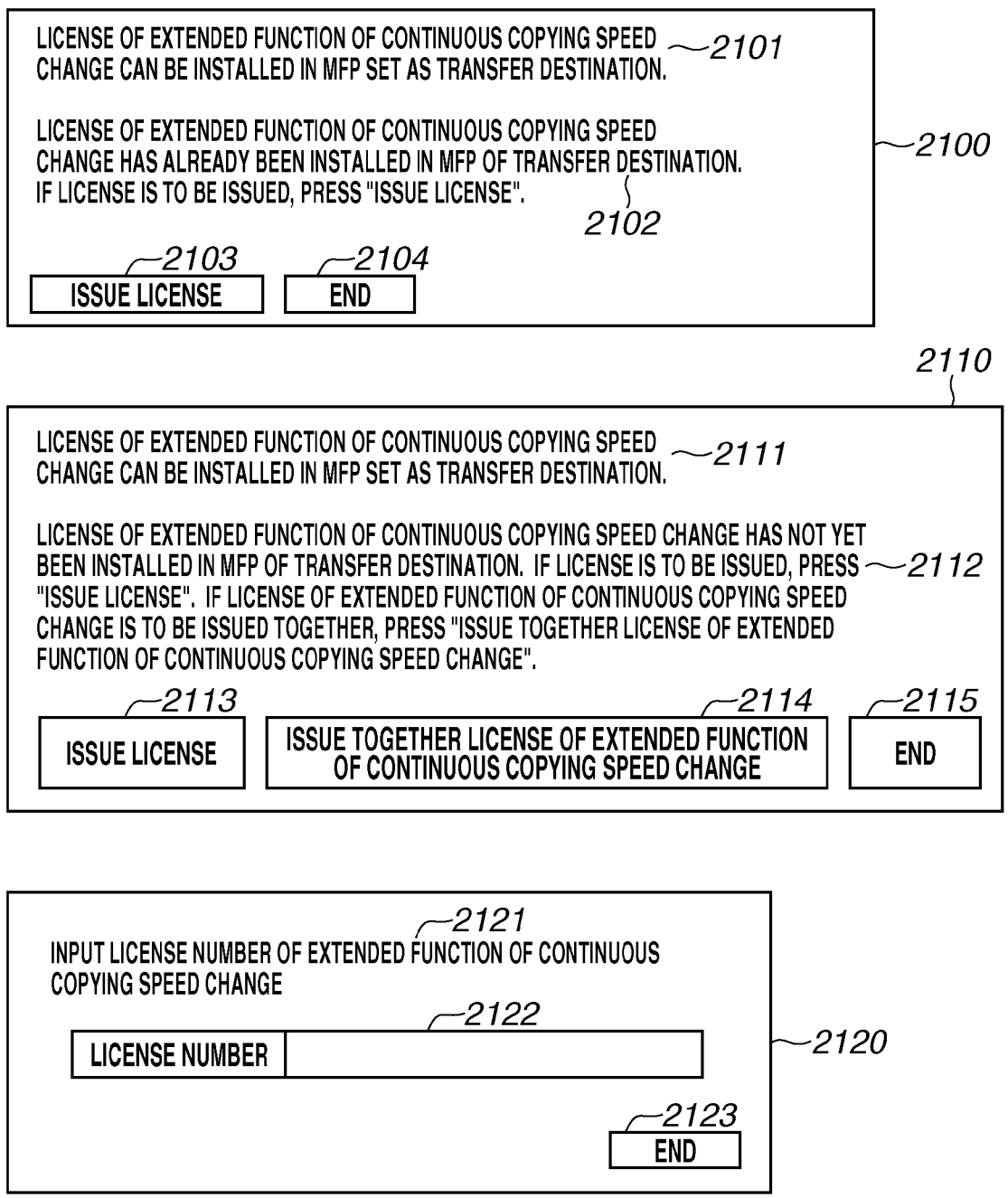

FIGS. 21A and 21B illustrate an example of a license confirmation screen which urges the user of the PC 103 to determine an operation for issuing an appropriate license in response to the license transfer request in the present exemplary embodiment. The license confirmation screen includes a license issuance confirmation screen 2100, a license selection issuance screen 2110, a license number input screen 2120, a license selection issuance screen 2130, a license issuance success screen 2140, and a license issuance failure screen 2150.

The license issuance confirmation screen 2100 is a screen displayed on the user interface 201 to notify the user of the PC 103 of the issuance of the license in response to the license transfer request. A guidance message display label 2101 is a label which provides the operator of the PC 103 with information about the MFP to which the license is transferred. The guidance message display label 2101 displays information based on the value of the continuous copying speed setting column 605 acquired in step S1805. More specifically, if the value of the continuous copying speed setting column 605 is "optional" or "essential," the guidance message display label 2101 displays a message indicating that the license of the extended function for changing the continuous copying speed can be installed in the MFP. If the value of the continuous copying speed setting column 605 is "unnecessary," the message is not displayed in particular.

A screen operation guide label 2102 is a label which provides the operator of the PC 103 with information as to whether the license of the extended function for changing the continuous copying speed is installed in the MFP to which the license is transferred. The label displays the information based on the value of the function type column 613 captured in step S1807. The license issuance confirmation screen 2100 proves that the license of the extended function for changing the continuous copying speed has been installed in step S1807. For this reason, the license issuance confirmation screen 2100 always displays the message indicating that the license of the extended function for changing the continuous copying speed is installed and the message urging the operator of the PC 103 to press a license issuance button 2103.

The license issuance button 2103 is a button that instructs the license issuance unit 404 to start issuing the license according to the license transfer request when the operator of the PC 103 presses the button via the user interface 201 of the PC 103. An end button 2104 is a button that ends a series of operations for issuing the license when the operator of the PC 103 presses the button via the user interface 201 of the PC 103. The license selection issuance screen 2110 is a screen which is displayed on the user interface 201 and urges the user of the PC 103 to select which of the issuance of the license in response to the license transfer request or the issuance of the license together with the issuance of the license of the extended function for changing the continuous copying speed.

The license selection issuance screen 2110 includes a guidance message display label 2111, a screen operation guidance label 2112, a license issuance button 2113, a license simultaneous issuance button 2114, and an end button 2115. The guidance message display label 2111 is a label which provides the operator of the PC 103 with information about the MFP to which the license is transferred. The guidance message display label 2111 is similar to the guidance message display label 2101, so that the detailed description thereof is omitted.

The screen operation guidance label 2112 is a label which provides the operator of the PC 103 with information indicating whether the license of the extended function for changing the continuous copying speed is installed in the MFP to which the license is transferred. The screen operation guidance label 2112 is similar to the screen operation guide label 2102, so that the detailed description thereof is omitted. The license selection issuance screen 2110 proves that license of the extended function for changing the continuous copying speed has not been installed in step S1807. For this reason, the license selection issuance screen 2110 always displays a message indicating that the license of the extended function for changing the continuous copying speed is not installed and a message urging the operator of the PC 103 to press any of the license issuance button 2113 or the license simultaneous issuance button 2114.

The license issuance button 2113 is a button that instructs the license issuance unit 404 to start issuing the license according to the license transfer request when the operator of the PC 103 presses the button via the user interface 201 of the PC 103. The license simultaneous issuance button 2114 is a button for displaying the license number input screen 2120 on the user interface of the PC 103 when the operator of the PC 103 presses the button via the user interface 201 of the PC 103. The end button 2115 is a button that ends a series of operations for issuing the license when the operator of the PC 103 presses the button via the user interface 201 of the PC 103.

The license number input screen 2120 is a screen that urges the user of the PC 103 to input the license number which corresponds to the extended function for changing the continuous copying speed and is installed in the MFP to which the license is transferred. The license number input screen 2120 includes a guidance message display label 2121, a license number input form 2122, and an end button 2123. The guidance message display label 2121 is a label that urges the operator of the PC 103 to input the license number. The license number input form 2122 is an input form for receiving the license number corresponding to the license to be issued, from the operator of the PC 103 via the user interface 201 of the PC 103. The end button 2123 is a button that ends the operation of input of the license number when the operator of the PC 103 presses the button via the user interface 201 of the PC 103.

A guidance message display label 2131 is a label which provides the operator of the PC 103 with information about the MFP to which the license is transferred. The guidance message display label 2131 is similar to the guidance message display label 2101, so that the detailed description thereof is omitted. A screen operation guidance label 2132 is a label which provides the operator of the PC 103 with information as to whether the license of the extended function for changing the continuous copying speed is installed in the MFP to which the license is transferred. The screen operation guidance label 2132 is similar to the screen operation guidance label 2102, so that the detailed description thereof is omitted. The license selection issuance screen 2130 proves that license of the extended function for changing the continuous copying speed has not been installed in step S1807. For this reason, the license selection issuance screen 2130 always displays a message indicating that the license of the extended function for changing the continuous copying speed is not installed and a message urging the operator of the PC 103 to press the license simultaneous issuance button 2133.

The license simultaneous issuance button 2133 is a button that displays the license number input screen 2120 on the user interface 201 of the PC 103 when the operator of the PC 103 presses the button via the user interface 201 of the PC 103. An end button 2134 is a button for ending a series of operations for issuing the license when pressed by the operator of the PC 103 via the user interface 201 of the PC 103.

A license issuance success screen 2140 is a screen for transmitting a response to the license issuance request when the license management server 102 succeeds in the issuance of the license. The guidance message display label 2141 is a label for displaying a message that notifies the operator of the PC 103 that the license is successfully issued. A license acquisition link 2142 is a link whereby to enable acquiring the license issued by the license management server 102 when the user presses the link via the user interface 201. Pressing the license acquisition link 2142 stores the acquired license in the secondary storage device 206 of the PC 103. An end button 2143 is a button for ending a series of operations for issuing the license when pressed by the operator of the PC 103 via the user interface 201 of the PC 103.

A license issuance failure screen 2150 is a screen for transmitting a response to the license issuance request when the license management server 102 fails in the issuance of the license. A guidance message display label 2151 is a label for displaying a message that notifies the operator of the PC 103 that the license management server 102 fails in the issuance of the license. A license issuance failure reason display label 2152 is a label for displaying a message that notifies the operator of the PC 103 of a detailed reason why the license management server 102 fails in the issuance of the license. An end button 2153 is a button for ending a series of operations for issuing the license when pressed by the operator of the PC 103 via the user interface 201 of the PC 103.

In step S1809, the license issuance determination unit 403 confirms whether the license issuance button 2103 on the license issuance confirmation screen 2100 is pressed. If the license issuance button 2103 is pressed (YES in step S1809), the processing proceeds to step S1810 to issue the license. If the end button 2104 is pressed (NO in step S1809), the information acquired by performing a series of operations is deleted. Then, the processing is ended.

In step S1810, the license issuance unit 404 issues the license in response to the license transfer request received in step S1801. The license information management unit 408 refers to the license information management table 650 to acquire license information in which the data of the disabling license 2002 acquired in step S1803 agree with the values of the license ID column 651 and the device number column 653. The value of the license ID column 651 is changed to a new value based on the acquired license information to generate a new license information in which the value of the device number column 653 is changed to the device number 2001 acquired in step S1802. The license issuance unit 404 issues the license based on the newly generated license information. The license information management unit 408 refers to the license information management table 650 to delete the license information in which the value of the license ID column 1501 of the disabling license 2002 agrees with that of the license ID column 651.

In step S1811, the license issuance determination unit 403 confirms the value of the continuous copying speed setting column 605 acquired in step S1805. If the value of the continuous copying speed setting column 605 is "optional" (YES in step S1811), the processing proceeds to step S1812. If the value of the continuous copying speed setting column 605 is "essential" (NO in step S1811), the processing proceeds to step S1815. In step S1812, the transmission unit 402 transmits the license selection issuance screen 2110 to the PC 103 according to the instruction of the control unit 400 of the license management server 102. The PC 103 receives the license selection issuance screen 2110 from the transmission unit 402 and displays the screen 2110 on the user interface 201 and the processing proceeds to step S1813.

In step S1813, the license issuance determination unit 403 confirms whether the license simultaneous issuance button 2114 on the license selection issuance screen 2110 is pressed. If the license simultaneous issuance button 2114 is pressed (YES in step S1813), the license issuance determination unit 403 displays the license number input screen 2120 on the user interface 201 of the PC 103. When the user of the PC 103 inputs the license number of the extended function for changing the continuous copying speed which can be installed in the MFP to which the license is transferred into the license number input form 2122 and presses the end button 2123, the processing proceeds to step S1814. Then, both of the license of the extended function for changing the continuous copying speed and the license in response to the license transfer request are issued. If the license issuance button 2113 or the end button 2115 is pressed (NO in step S1813), the processing proceeds to step S1809.

In step S1814, the license issuance unit 404 issues the license in response to the license transfer request acquired in step S1801 and the license of the extended function for changing the continuous copying speed corresponding to the license number acquired in step S1813. FIG. 22 is a flow chart illustrating a series of operations for simultaneously issuing the license in response to the license transfer request and the license of the extended function for changing the continuous copying speed in step S1814.

In step S2201, the license issuance determination unit 403 refers to the license number management table 640 to confirm information about the license number which is the same in value as the license number acquired in step S1813. If there exists information about the license number (YES in step S2201), the license issuance determination unit 403 acquires the information about the license number which agrees therewith and the processing proceeds to step S2202. If there does not exist information about the license number (NO in step S2201), the transmission unit 402 of the license management server 102 transmits the license issuance failure screen 2150 to the user interface 201 of the PC 103 and ends the license issuance processing.

In step S2202, the license issuance determination unit 403 confirms whether the value of the license issuance status 643 of the information about the license number acquired in step S2201 is "unissued." If the value of the license issuance status 643 is "unissued" (YES in step S2202), the processing proceeds to step S2203. If the value of the license issuance status 643 is "issued" (NO in step S2202), the transmission unit 402 of the license management server 102 transmits the license issuance failure screen 2150 to the user interface 201 of the PC 103 and ends the license simultaneous issuance processing.

In step S2203, the license issuance unit 404 issues the license of the extended function for changing the continuous copying speed corresponding to the license number acquired in step S1813 and the device number acquired in step S1802. Because step S2203 is similar to the step S1115, the description thereof is omitted. In step S2204, the license issuance determination unit 403 refers to the continuous copying speed change software information management table 620 to acquire the value of the post-change model column 623 of data agreeing with that of the function ID of the license of the extended function for changing the continuous copying speed issued in step S2203.

In step S2205, the license information management unit 408 refers to the license information management table 650 to acquire the license information in which the data of the disabling license 1500 acquired in step S1803 agree with the values of the license ID column 651 and the device number column 653. New license information is generated such that the license ID column 651 is changed to a new value based on the acquired license information and the post-change model of value of the device number column 653 is changed into the value acquired in step S2204.

In step S2206, the license issuance unit 404 issues the license corresponding to the device number in which the extended function already installed in the MFP 104 is changed by installing the license of the extended function for changing the continuous copying speed based on the license information newly generated in step S2205. Since step S2206 is similar to step S1115, the description thereof is omitted. In step S2206, the license information management unit 408 deletes the license information acquired in step S2205 from the license information management table 650.

In step S1815, the transmission unit 402 transmits the license selection issuance screen 2130 to the PC 103. The PC 103 receives the license selection issuance screen 2130 from the transmission unit 402 and displays the screen 2130 on the user interface 201. The processing proceeds to step S1816. In step S1816, the license issuance determination unit 403 confirms whether the simultaneous issuance button 2133 on the license selection issuance screen 2130 is pressed.

If the simultaneous issuance button 2133 is pressed (YES in step S1816), the license issuance determination unit 403 displays the license number input screen 2120 on the user interface 201 of the PC 103. The user of the PC 103 inputs the license number of the extended function for changing the continuous copying speed which can be installed in the MFP to which the license is transferred into the license number input form 2122. When the end button 2123 is pressed, the processing proceeds to step S1814 and both of the license of the extended function for changing the continuous copying speed and the license in response to the license transfer request are issued. If the end button 2134 is pressed (NO in step S1816), the information acquired by a series of operations is deleted and the processing is ended.

According to the third exemplary embodiment, it is possible to prevent the license from being redundantly issued by determining whether the device number of the MFP may be changed after the license is transferred, when the license of the extended function for the MFP is transferred.

The present invention can also be realized by executing the following processing. More specifically, the processing is such that the software (program) realizing the function of the above exemplary embodiments is supplied to a system or an apparatus via a network or various storage media and the computer (or a central processing unit (CPU) or a microprocessor unit (MPU)) of the system or the apparatus reads and executes the program.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-013320 filed Jan. 28, 2013, which is hereby incorporated by reference herein in its entirety.

What is claimed is:

1. A license management server comprising:
   an issuance unit configured to issue, in response to a license issuance request being received, a license required for setting a continuous copying speed of an image forming apparatus to a continuous copying speed specified by the license issuance request, the license issued by the issuance unit including information required for changing a device number of the image forming apparatus to which the continuous copying speed is set; and
   a transmission unit configured to transmit the license,
   wherein the issuance unit issues a license of an extended function corresponding to the image forming apparatus to which the license is transferred if the continuous copying speed is set to the image forming apparatus to which the license is transferred in response to reception of a license transfer request including a device number of the image forming apparatus to which the license of the extended function is transferred and a disabling license for disabling the license of the extended function.

2. The license management server according to claim 1, wherein the issuance unit issues the license required for setting the continuous copying speed in response to reception of the disabling license for disabling another license already issued to the image forming apparatus to which the continuous copying speed is set.

3. The license management server according to claim 2, further comprising:
   a determination unit configured to determine whether another license has already been issued to the image forming apparatus to which the continuous copying speed is set in response to the license issuance request being received; and
   a provision unit configured to provide a disabling license input screen for inputting the disabling license in response to the other license being determined as having already been issued.

4. The license management server according to claim 1, further comprising:
   a reception unit configured to receive a license issuance request including a device number required for identifying an image forming apparatus and a license number; and
   a management unit configured to manage the license corresponding to the license number as being issued in response to the issuance unit issuing the license, and to manage the license number, the license issued by the issuance unit, and the device number in association with one another.

5. The license management server according to claim 4, wherein the management unit performs management so that a new device number acquired due to the device number of the image forming apparatus to which the continuous copying speed is set being changed in response to the issuance unit issuing the license required for setting the continuous copying speed is associated with another license already issued to the image forming apparatus to which the continuous copying speed is set.

6. The license management server according to claim 1, wherein the determination unit determines whether the image forming apparatus to which the license is transferred is an image forming apparatus to which the continuous copying speed needs to be set if the continuous copying speed is not set to the image forming apparatus to which the license is transferred, and
   wherein the provision unit provides a screen for urging the issuance of a license required for setting the continuous copying speed of the image forming apparatus to which the license is transferred in response to the determination unit determining that the image forming apparatus to which the license is transferred is the image forming apparatus to which the continuous copying speed needs to be set.

7. The license management server according to claim 1, wherein the issuance unit issues both the license of the extended function corresponding to the image forming apparatus to which the license is transferred and the license for setting the continuous copying speed of the image forming apparatus if the continuous copying speed is not set to the image forming apparatus to which the license is transferred.

8. A method for controlling a license management server, the method comprising:
   issuing, in response to a license issuance request being received, a license required for setting a continuous copying speed of an image forming apparatus to a continuous copying speed specified by the license issuance request, the issued license including information required for changing a device number of the image forming apparatus to which the continuous copying speed is set; and transmitting the license, wherein the issuance unit issues a license of an extended function corresponding to the image forming apparatus to which the license is transferred if the continuous copying speed is set to the image forming apparatus to which the license is transferred in response to reception of a license transfer request including a device number of the image forming apparatus to which the license of the extended function is transferred and a disabling license for disabling the license of the extended function.

9. The method according to claim 8, further comprising issuing the license required for setting the continuous copying speed in response to reception of the disabling license for disabling another license already issued to the image forming apparatus to which the continuous copying speed is set.

10. The method according to claim 9, further comprising:
determining whether another license has already been issued to the image forming apparatus to which the continuous copying speed is set in response to the license issuance request being received; and
providing a disabling license input screen for inputting the disabling license in response to the other license being determined as having already been issued.

11. The method according to claim 8, further comprising:
receiving a license issuance request including a device number required for identifying an image forming apparatus and a license number; and
managing the license corresponding to the license number as being issued in response to the license being issued, and managing the license number, the issued license, and the device number in association with one another.

12. The method according to claim 11, further comprising performing management so that a new device number acquired due to the device number of the image forming apparatus to which the continuous copying speed is set being changed in response to the license required for setting the continuous copying speed being issued is associated with another license already issued to the image forming apparatus to which the continuous copying speed is set.

13. The method according to claim 8, further comprising:
determining whether the image forming apparatus to which the license is transferred is an image forming apparatus to which the continuous copying speed needs to be set if the continuous copying speed is not set to the image forming apparatus to which the license is transferred; and
providing a screen for urging the issuance of a license required for setting the continuous copying speed of the image forming apparatus to which the license is transferred in response to determining that the image forming apparatus to which the license is transferred is the image forming apparatus to which the continuous copying speed needs to be set.

14. The method according to claim 8, further comprising issuing both the license of the extended function corresponding to the image forming apparatus to which the license is transferred and the license for setting the continuous copying speed of the image forming apparatus if the continuous copying speed is not set to the image forming apparatus to which the license is transferred.

15. A non-transitory storage media storing a program that causes a license management server to execute the method according to claim 8.

16. A license system including a license management server and an image forming apparatus, the license system comprising:
an issuance unit configured to issue, in response to a license issuance request being received, a license required for setting a continuous copying speed of the image forming apparatus to a continuous copying speed specified by the license issuance request, the license issued by the issuance unit including information required for changing a device number of the image forming apparatus to which the continuous copying speed is set; and
a transmission unit configured to transmit the license,
wherein the issuance unit issues a license of an extended function corresponding to the image forming apparatus to which the license is transferred if the continuous copying speed is set to the image forming apparatus to which the license is transferred in response to reception of a license transfer request including a device number of the image forming apparatus to which the license of the extended function is transferred and a disabling license for disabling the license of the extended function.

* * * * *